United States Patent
Adato et al.

(10) Patent No.: US 11,769,283 B2
(45) Date of Patent: Sep. 26, 2023

(54) GENERATING LOOPED VIDEO CLIPS

(71) Applicant: BRIA ARTIFICIAL INTELLIGENCE LTD., Tel Aviv (IL)

(72) Inventors: Yair Adato, Kfar Ben Nun (IL); Gal Jacobi, Hudson, NY (US); Dvir Yerushalmi, Tel Aiv (IL); Efrat Taig, Beer Sheva (IL)

(73) Assignee: BRIA ARTIFICIAL INTELLIGENCE LTD., Tel Aviv (IL)

( * ) Notice: Subject to any disclaimer, the term of this patent is extended or adjusted under 35 U.S.C. 154(b) by 42 days.

(21) Appl. No.: 17/519,366

(22) Filed: Nov. 4, 2021

(65) Prior Publication Data
US 2022/0156317 A1    May 19, 2022

Related U.S. Application Data

(63) Continuation of application No. PCT/US2021/057987, filed on Nov. 4, 2021.
(Continued)

(51) Int. Cl.
*G06T 11/40* (2006.01)
*G06Q 30/0203* (2023.01)
(Continued)

(52) U.S. Cl.
CPC .............. *G06T 11/40* (2013.01); *G06F 3/013* (2013.01); *G06F 3/0482* (2013.01);
(Continued)

(58) Field of Classification Search
CPC .......... G06T 11/40; G06T 11/00; G06T 11/60; G06F 3/013; G06F 3/0482; G06F 16/739;
(Continued)

(56) References Cited

U.S. PATENT DOCUMENTS 6,600,491 B1 * 7/2003 Szeliski .................. G06T 13/80
   348/700
2017/0017616 A1 * 1/2017 Elings ................... G06F 40/106
(Continued)

OTHER PUBLICATIONS

PCT International Search Report for International Application No. PCT/US2021/057987, dated Mar. 2, 2022, 5pp.
(Continued)

*Primary Examiner* — Girumsew Wendmagegn
(74) *Attorney, Agent, or Firm* — The Roy Gross Law Firm, LLC; Roy Gross

(57) ABSTRACT

Systems, methods and non-transitory computer readable media for generating looped video clips are provided. A still image may be received. The still image may be analyzed to generate a series of images. The series of images may include at least first, middle and last images. The first image may be substantially visually similar to the last image, and the middle image may be visually different from the first and last images. The series of images may be provided. Playing the series of images in a video clip that starts with the first image and finishes with the last image, and repeating the video clip from the first image immediately after completing the playing of the video clip with the last image may create visually smooth transaction in which the transition from the last image to the first image is visually indistinguishable from the transactions between frames within the video clip.

19 Claims, 15 Drawing Sheets

800

802 Receiving a still image

804 Analyzing the still image to generate a series of images, the series of images includes at least a first image, a middle image and a last image, the first image is substantially visually similar to the last image, and the middle image is visually different from the first image and the last image 806 Providing the series of images in a format that enables playing the series of images in a video clip that starts with the first image and finishes with the last image, wherein repeating the video clip from the first image immediately after completing the playing of the video clip with a presentation of the last image creates visually smooth transaction in which the transition from the last image to the first image is visually indistinguishable from the transactions between frames within the video clip

820

822 Determining a mathematical object corresponding to the still image in a mathematical space, the mathematical space includes at least a plurality of mathematical objects, each mathematical object of the plurality of mathematical objects corresponds to an image, the mathematical object corresponding to the still image is included in the plurality of mathematical objects 824 Using the mathematical space and the mathematical object corresponding to the still image to obtain two or more mathematical objects of the plurality of mathematical objects 826 Using the obtained two or more mathematical objects to generate the series of images

Related U.S. Application Data

(60) Provisional application No. 63/189,830, filed on May 18, 2021, provisional application No. 63/114,540, filed on Nov. 17, 2020.

(51) Int. Cl.
| | |
|---|---|
| *G06F 16/74* | (2019.01) |
| *G06F 16/738* | (2019.01) |
| *G06F 16/783* | (2019.01) |
| *G11B 27/034* | (2006.01) |
| *G11B 27/34* | (2006.01) |
| *G06V 20/40* | (2022.01) |
| *G06V 40/20* | (2022.01) |
| *G06F 3/01* | (2006.01) |
| *G11B 27/031* | (2006.01) |
| *G06F 40/166* | (2020.01) |
| *G06F 3/0482* | (2013.01) |
| *G06T 11/60* | (2006.01) |
| *G06V 20/00* | (2022.01) |
| *G06T 11/00* | (2006.01) |
| *G06N 3/045* | (2023.01) |

(52) U.S. Cl.
CPC .......... *G06F 16/739* (2019.01); *G06F 16/743* (2019.01); *G06F 16/784* (2019.01); *G06F 16/7837* (2019.01); *G06F 40/166* (2020.01); *G06N 3/045* (2023.01); *G06Q 30/0203* (2013.01); *G06T 11/00* (2013.01); *G06T 11/60* (2013.01); *G06V 20/00* (2022.01); *G06V 20/41* (2022.01); *G06V 20/49* (2022.01); *G06V 40/20* (2022.01); *G11B 27/031* (2013.01); *G11B 27/034* (2013.01); *G11B 27/34* (2013.01); *G06V 20/44* (2022.01)

(58) Field of Classification Search
CPC .. G06F 16/743; G06F 16/7837; G06F 16/784; G06F 40/166; G06F 40/284; G06F 40/30; G06F 40/56; G06N 3/045; G06N 20/00; G06N 3/047; G06Q 30/0203; G06V 20/00; G06V 20/41; G06V 20/49; G06V 40/20; G06V 20/44; G06V 10/454; G06V 10/82; G11B 27/031; G11B 27/034; G11B 27/34; G11B 27/28
See application file for complete search history.

(56) References Cited

U.S. PATENT DOCUMENTS

2019/0325626 A1    10/2019  Tao
2019/0378318 A1*  12/2019  Roache ................... G06T 11/60

OTHER PUBLICATIONS

PCT Written Opinion for International Application No. PCT/US2021/057987, dated Mar. 2, 2022, 8pp.

* cited by examiner

420

422 Analyzing an original visual content indicated by the indication of the desired visual content using the indication of the at least one aspect of the visual brand language to determine at least one brand related visual aspect of the original visual content and a plurality of brand independent visual aspects of the original visual content

424 Receiving an indication of a particular visual aspect of the original visual content of the plurality of brand independent visual aspects for modification

426 Analyzing the original visual content to generate the new visual content consistent with the visual brand language and corresponding to the desired visual content, the new visual content is substantially identical to the original visual content with respect to the at least one brand related visual aspect and differs from the original visual content in the particular visual aspect of the original visual content

| 802 Receiving a still image |

| 804 Analyzing the still image to generate a series of images, the series of images includes at least a first image, a middle image and a last image, the first image is substantially visually similar to the last image, and the middle image is visually different from the first image and the last image |

| 806 Providing the series of images in a format that enables playing the series of images in a video clip that starts with the first image and finishes with the last image, wherein repeating the video clip from the first image immediately after completing the playing of the video clip with a presentation of the last image creates visually smooth transaction in which the transition from the last image to the first image is visually indistinguishable from the transactions between frames within the video clip |

822 Determining a mathematical object corresponding to the still image in a mathematical space, the mathematical space includes at least a plurality of mathematical objects, each mathematical object of the plurality of mathematical objects corresponds to an image, the mathematical object corresponding to the still image is included in the plurality of mathematical objects

824 Using the mathematical space and the mathematical object corresponding to the still image to obtain two or more mathematical objects of the plurality of mathematical objects

826 Using the obtained two or more mathematical objects to generate the series of images

| 902 Accessing a particular visual content |

↓

| 904 Determining a particular mathematical object corresponding to the particular visual content in a mathematical space, the mathematical space includes at least a plurality of mathematical objects, each mathematical object of the plurality of mathematical objects corresponds to a visual content |

↓

| 906 Using the mathematical space and the particular mathematical object corresponding to the particular visual content to obtain at least a first mathematical object and a second mathematical object of the plurality of mathematical objects |

↓

| 908 Using the visual content corresponding to the first mathematical object in a communication with a first user and the visual content corresponding to the second mathematical object in a communication with a second user |

↓

| 910 Receiving an indication of a reaction of the first user to the communication with the first user and an indication of a reaction of the second user to the communication with the second user |

↓

| 912 Obtaining a third visual content based on the reaction of the first user and the reaction of the second user |

↓

| 914 Using the third visual content in a communication with a third user |

FIG. 9

GENERATING LOOPED VIDEO CLIPS

CROSS REFERENCES TO RELATED APPLICATIONS

This application is a continuation of PCT Application No. PCT/US2021/057987, having an International filing date of Nov. 4, 2021, which claims priority under 35 U.S.C. § 119 to U.S. Provisional Patent Application No. 63/114,540, filed on Nov. 17, 2020, and U.S. Provisional Patent Application No. 63/189,830, filed on May 18, 2021. The entire contents of all of the above-identified applications are herein incorporated by reference.

BACKGROUND

I. Technical Field

The present disclosure relates generally to the field of video generation. More specifically, the present disclosure relates to systems and methods for generating looped video clips from a still image.

II. Background Information

Vast number of visual contents, such as images and videos, are created, edited and viewed by different entities. Nowadays, many visual contents are modified to better suit different criteria. However, achieving high quality results when modifying visual contents still requires significant efforts. Moreover, selecting the optimal modification for different purposes is still challenging. This is especially true when modification to a large number of visual content items is required. Therefore, automating the modification of visual contents is desired.

SUMMARY

Embodiments consistent with the present disclosure provide systems, methods and non-transitory computer readable media for visual content generation.

In one examples, systems, methods and non-transitory computer readable media for generating visual content consistent with aspects of a visual brand language are provided.

In some examples, an indication of at least one aspect of a visual brand language may be received. An indication of a desired visual content may be received. A new visual content consistent with the visual brand language and corresponding to the desired visual content may be generated based on the indication of the at least one aspect of the visual brand language and the indication of the desired visual content. Further, the new visual content may be provided in a format ready for presentation.

In one example, the indication of the at least one aspect of the visual brand language may be based on an analysis of a visual style guide corresponding to the brand. In one example, the indication of the at least one aspect of the visual brand language may be based on an analysis of at least one of a website corresponding to the brand, a social network profile corresponding to the brand and a user interface corresponding to the brand. In one example, the indication of the at least one aspect of the visual brand language may be based on an analysis of historic visual contents corresponding to the brand. In one example, the indication of the at least one aspect of the visual brand language may be based on an analysis a plurality of responses of different people to a questionnaire. In one example, the generation of the new visual content consistent with the visual brand language and corresponding to the desired visual content may be further based on a target audience.

In one example, an indication of a relation between a plurality of historic visual contents and historic impact may be received, and the generation of the new visual content consistent with the visual brand language and corresponding to the desired visual content may be further based on the relation. In one example, an original visual content may be transmitted over a communication line from a server to an end device, and the indication of the desired visual content may be determined based on the original visual content by a third computing device different from the server and the end device accessing the communication line.

In some examples, the visual brand language may correspond to a particular brand, the indication of the desired visual content may include an indication of an original visual content, the original visual content may include at least a visual element corresponding to the particular brand and a visual element unrelated to the particular brand, and the new visual content consistent with the visual brand language and corresponding to the desired visual content may include at least the visual element corresponding to the particular brand and a manipulated version of the visual element unrelated to the particular brand. In one example, the indication of the at least one aspect of the visual brand language may be used to identify the visual element corresponding to the particular brand and the visual element unrelated to the particular brand in the original visual content. In one example, the visual element corresponding to the particular brand may include at least one of a logo corresponding to the particular brand, a product corresponding to the particular brand and an element in a color corresponding to the particular brand.

In some examples, the indication of the desired visual content may include an indication of an original visual content; the original visual content may be analyzed using the indication of the at least one aspect of the visual brand language to determine at least one brand related visual aspect of the original visual content and a plurality of brand independent visual aspects of the original visual content; an indication of a particular visual aspect of the original visual content of the plurality of brand independent visual aspects for modification may be received; and the original visual content may be analyzed to generate the new visual content consistent with the visual brand language and corresponding to the desired visual content. The new visual content may be substantially identical to the original visual content with respect to the at least one brand related visual aspect and may differ from the original visual content in the particular visual aspect of the original visual content. In one example, the at least one brand related visual aspect of the original visual content may include at least one of a color scheme of at least a part of the original visual content, a logo depicted in the original visual content and a product depicted in the original visual content. In one example, the plurality of brand independent visual aspects of the original visual content may include at least two of a gender of a person depicted in the original visual content, a race of the person depicted in the original visual content and an age of the person depicted in the original visual content. In one example, the plurality of brand independent visual aspects of the original visual content may include at least two of a hairstyle of a person depicted in the visual, a visual aspect of an article of clothing of the person depicted in the original visual content and a visual aspect of an accessory used by the person depicted in the original visual content. In one example, the plurality of brand independent visual aspects of the original visual content may include a landscape depicted in the original visual content. In one example, the plurality of brand independent visual aspects of the original visual content may include at least two different visual aspects of an object depicted in the original visual content. In some examples, the original visual content may be analyzed to embed the original visual content in a mathematical space. For example, the mathematical space may include at least one direction corresponding to the at least one brand related visual aspect of the original visual content and/or at least one direction corresponding to the particular visual aspect of the original visual content for modification. In one example, the embedding the original visual content in the mathematical space may be used to determine a new point in the mathematical space. For example, the new point may be on a plain in the mathematical space that is substantially perpendicular to the at least one direction corresponding to the at least one brand related visual aspect of the visual. For example, the distance between the embedding of the original visual content in the mathematical space and the plain may be less than a particular threshold. Further, the new point in the mathematical space may be used to generate the new visual content consistent with the visual brand language and corresponding to the desired visual content.

In some examples, the indication of the desired visual content may include an indication of an original visual content, and the generation of the new visual content consistent with the visual brand language and corresponding to the desired visual content may include a modification of at least part of the original visual content according to the visual brand language. In some examples, the indication of the desired visual content may include an indication of an original visual content, and the generation of the new visual content consistent with the visual brand language and corresponding to the desired visual content may include an insertion of an object corresponding to the visual brand language to the original visual content.

In some examples, the indication of the desired visual content may include an indication of an original visual content, and a convolution of at least part of the original visual content may be calculated. In one example, in response to a first value of the calculated convolution, a first visual content consistent with the visual brand language and corresponding to the desired visual content may be generated, and in response to a second value of the calculated convolution, a second visual content consistent with the visual brand language and corresponding to the desired visual content may be generated.

In some examples, the indication of the at least one aspect of the visual brand language may include an indication of a family of shapes, and the new visual content may include a depiction of an object with a shape corresponding to the family of shapes. In some examples, the indication of the at least one aspect of the visual brand language may include an indication of a color scheme, and the new visual content may include a depiction corresponding to the color scheme. In some examples, the indication of the at least one aspect of the visual brand language may include an indication of typographical preference, and the new visual content may include a depiction of text corresponding to the typographical preference.

In some examples, a generative adversarial network may be used to generate the new visual content consistent with the visual brand language and corresponding to the desired visual content. In some examples, a first value may be selected based on the indication of the at least one aspect of the visual brand language, and a conditional generative adversarial network may be used with the first value as an input condition to generate the new visual content consistent with the visual brand language and corresponding to the desired visual content. In some examples, a first value may be selected based on the indication of the desired visual content, and a conditional generative adversarial network may be used with the first value as an input condition to generate the new visual content consistent with the visual brand language and corresponding to the desired visual content.

In some examples, an indication of a characteristic of a user may be received, and the generation of the new visual content consistent with the visual brand language and corresponding to the desired visual content may be further based on the indication of the characteristic of the user.

In one examples, systems, methods and non-transitory computer readable media for generating and modifying synthetic visual content using textual input are provided.

In some examples, one or more keywords may be received from a user. The one or more keywords may be used to generate a plurality of textual descriptions. Each generated textual description may correspond to a possible visual content. The generated plurality of textual descriptions may be presented to the user through a user interface that enables the user to modify the presented textual descriptions. A modification to at least one of the plurality of textual descriptions may be received from the user, therefore obtaining a modified plurality of textual descriptions. A selection of one textual description of the modified plurality of textual descriptions may be received from the user. A plurality of visual contents corresponding to the selected textual description may be presented to the user.

In some examples, the one or more keywords may include at least one object, and each generated textual description may include an indication of the at least one object. In some examples, the one or more keywords may include at least one action, and each generated textual description may include an indication of the at least one action. In some examples, the one or more keywords may include at least one visual characteristic, and each generated textual description may include an indication of an object with the at least one visual characteristic.

In some examples, presenting the generated plurality of textual descriptions to the user may include a presentation in conjunction with each textual description of a sample visual content corresponding to the textual description. In one example, for example in response to the received modification to a particular textual description, a modification to the presented sample visual content corresponding to the particular textual description may be caused, the modification to the presented sample visual content may correspond to the received modification to the particular textual description.

In some examples, at least one of the plurality of visual contents corresponding to the selected textual description from a plurality of alternative visual contents may be selected based on the selected textual description. In some examples, at least one of the plurality of visual contents corresponding to the selected textual description may be generated using a generative adversarial network. In some examples, at least one of the plurality of visual contents corresponding to the selected textual description may be generated using a conditional generative adversarial network with an input condition selected based on the selected textual description. In some examples, the generation of the plurality of textual descriptions may be based on the user. In some examples, at least one of the plurality of visual contents corresponding to the selected textual description may be generated based on the user. In some examples, information related to a brand may be received, and the generation of the plurality of textual descriptions may be based on the information related to the brand.

In some examples, the selected textual description may be used to select a visual content of a plurality of alternative visual contents, and a convolution of at least part of the selected visual content may be calculated. In one example, in response to a first value of the calculated convolution, a first visual content may be included in the plurality of visual contents corresponding to the selected textual description, and in response to a second value of the calculated convolution, including the first visual content in the plurality of visual contents corresponding to the selected textual description may be forgone.

In some examples, information related to a brand may be received, and each one of the plurality of visual contents corresponding to the selected textual description may include at least one object corresponding to the brand. In one example, the at least one object corresponding to the brand may include a logo corresponding to the brand. In one example, the at least one object corresponding to the brand may include a product corresponding to the brand.

In some examples, information related to a brand may be received, and each one of the plurality of visual contents corresponding to the selected textual description may include at least one segment with a color scheme corresponding to the brand. In some examples, information related to a brand may be received, and each one of the plurality of visual contents corresponding to the selected textual description may include at least one depiction of text presented with typographical characteristics corresponding to the brand.

In one examples, systems, methods and non-transitory computer readable media for generating looped video clips are provided.

In some examples, a still image may be received. The still image may be analyzed to generate a series of images. The series of images may include at least a first image, a middle image and a last image. The first image may be substantially visually similar to the last image, and the middle image may be visually different from the first image and the last image. The series of images may be provided in a format that enables playing the series of images in a video clip that starts with the first image and finishes with the last image. Repeating the video clip from the first image immediately after completing the playing of the video clip with a presentation of the last image may create visually smooth transaction in which the transition from the last image to the first image may be visually indistinguishable from the transactions between frames within the video clip. In some examples, a mathematical object corresponding to the still image in a mathematical space may be determined. The mathematical space may include at least a plurality of mathematical objects. Each mathematical object of the plurality of mathematical objects may correspond to an image. The mathematical object corresponding to the still image may be included in the plurality of mathematical objects. The mathematical space and/or the mathematical object corresponding to the still image may be used to obtain two or more mathematical objects of the plurality of mathematical objects. The obtained two or more mathematical objects may be used to generate the series of images.

In some examples, each image of the series of images may correspond to one of the two or more mathematical objects.

In one example, the distance in the mathematical space between any two mathematical objects corresponding to adjunct images of the series of images may be below a particular threshold. In one example, the distance in the mathematical space between the two mathematical objects corresponding to the first image and the last image may be below the particular threshold. In one example, the distance in the mathematical space between the two mathematical objects corresponding to the first image and the middle image may be above the particular threshold.

In some examples, the mathematical space is a non-orientable space. In some examples, the still image may be analyzed to generate the mathematical space.

In some examples, the mathematical object corresponding to the still image may be used to obtain a mathematical curve in the mathematical space, and the mathematical curve may be used to obtain the two or more mathematical objects of the plurality of mathematical objects. In one example, the obtained two or more mathematical objects may be points on the mathematical curve. In one example, an order of images in the series of images may correspond to an order of the points on the mathematical curve.

In some examples, the still image may include a depiction of a cloud, and the series of images may include different depictions of the cloud. In some examples, the series of images may include depictions of a first cloud and a second cloud, and the depiction of the first cloud in the first image may be substantially visually similar to the depiction of the second cloud in the last image. In one example, the second cloud may not be visible in the first image, the first cloud may not be visible in the last image, and both the first cloud and the second cloud may be visible in the middle image.

In some examples, the still image may include a depiction of a bird, and the series of images may include different depictions of the bird. In some examples, the series of images may include depictions of a first bird and a second bird, and the depiction of the first bird in the first image may be substantially visually similar to the depiction of the second bird in the last image. In one example, the second bird may not be visible in the first image, the first bird may not be visible in the last image, and both the first bird and the second bird may be visible in the middle image.

In some examples, still image may include a depiction of a vehicle, the series of images may include different depictions of the vehicle. In some examples, the series of images may include depictions of a first vehicle and a second vehicle, and the depiction of the first vehicle in the first image may be substantially visually similar to the depiction of the second vehicle in the last image. In one example, the second vehicle may not be visible in the first image, the first vehicle may not be visible in the last image, and both the first vehicle and the second vehicle may be visible in the middle image.

In one examples, systems, methods and non-transitory computer readable media for optimizing visual contents are provided.

In some examples, a particular visual content may be accessed. A particular mathematical object corresponding to the particular visual content in a mathematical space may be determined. The mathematical space may include at least a plurality of mathematical objects. Each mathematical object of the plurality of mathematical objects may correspond to a visual content. The mathematical space and the particular mathematical object corresponding to the particular visual content may be used to obtain at least a first mathematical object and a second mathematical object of the plurality of mathematical objects. The visual content corresponding to the first mathematical object may be used in a communication with a first user and the visual content corresponding to the second mathematical object may be used in a communication with a second user. An indication of a reaction of the first user to the communication with the first user and an indication of a reaction of the second user to the communication with the second user may be received. A third visual content may be obtained based on the reaction of the first user and the reaction of the second user. The third visual content may be used in a communication with a third user. In some examples, the mathematical space may be a non-orientable space.

In some examples, the third visual content may be selected from the visual content corresponding to the first mathematical object and the visual content corresponding to the second mathematical object based on the reaction of the first user and the reaction of the second user. In some examples, the third visual content may differ from the visual content corresponding to the first mathematical object and the visual content corresponding to the second mathematical object. In some examples, the reaction of the first user and the reaction of the second user may be used to determine a linear combination of the first mathematical object and the second mathematical object in the mathematical space, and the third visual content may correspond to the linear combination of the first mathematical object and the second mathematical object.

In some examples, the reaction of the first user and the reaction of the second user may be used to determine a linear combination of the first mathematical object and the second mathematical object in the mathematical space. The linear combination of the first mathematical object and the second mathematical object may not be included in the plurality of mathematical objects. A mathematical object of the plurality of mathematical objects nearest to the linear combination of the first mathematical object and the second mathematical object may be determined. The third visual content corresponds to the mathematical object of the plurality of mathematical objects nearest to the linear combination of the first mathematical object and the second mathematical object.

In some examples, the distance between the first mathematical object and the second mathematical object in the mathematical space may be larger than both the distance between the particular mathematical object and the first mathematical object in the mathematical space and the distance between the particular mathematical object and the second mathematical object in the mathematical space. In some examples, the third visual content may correspond to a third mathematical object in the mathematical space, and the distance between the third mathematical object and the particular mathematical object in the mathematical space may be larger than at least one of the distance between the third mathematical object and the first mathematical object in the mathematical space and the distance between the third mathematical object and the second mathematical object in the mathematical space.

In some examples, the reaction of the first user and the reaction of the second user may be used to select one direction of a direction of the first mathematical object with respect to the particular mathematical object in the mathematical space and a direction of the second mathematical object with respect to the particular mathematical object in the mathematical space. The direction of the first mathematical object with respect to the particular mathematical object in the mathematical space may differ from the direction of the second mathematical object with respect to the particular mathematical object in the mathematical space. The selected direction may be used to obtain the third visual content. In one example, the selected direction may be used to determine a third mathematical object in the mathematical space, and the third mathematical object may be used to obtain the third visual content. For example, a direction of the third mathematical object with respect to the particular mathematical object in the mathematical space may be substantially identical to the direction of the first mathematical object with respect to the particular mathematical object in the mathematical space. In another example, the distance of the third mathematical object from the particular mathematical object in the mathematical space may be larger than the distance of the first mathematical object from the particular mathematical object in the mathematical space. In one example, the direction of the first mathematical object with respect to the particular mathematical object in the mathematical space may correspond to a first visual property of the corresponding visual contents and the direction of the second mathematical object with respect to the particular mathematical object in the mathematical space may correspond to a second visual property of the corresponding visual contents, the second visual property may differ from the first visual property. For example, the first visual property may be size of at least one object and the second visual property may be brightness of the at least one object. In another example, the first visual property may be age of at least one person and the second visual property may be ethnicity of the at least one person. In yet another example, the first visual property may be quantity of at least one object and the second visual property may be type of the at least one object.

In some examples, a plain in the mathematical space created by the first mathematical object, the second mathematical object and the particular mathematical object may be substantially perpendicular to a direction in the mathematical space corresponding to a brand.

In some examples, the particular visual content may be unrelated to a brand, and the visual content corresponding to the first mathematical object and the visual content corresponding to the second mathematical object may be related to the brand. In one example, the visual content corresponding to the first mathematical object may include a first product corresponding to the brand and the visual content corresponding to the second mathematical object may include a second product corresponding to the brand, the second product differs from the first product.

In one examples, systems, methods and non-transitory computer readable media for propagating changes from one visual content to other visual contents are provided.

In some examples, a plurality of visual contents may be accessed. A first visual content and a modified version of the first visual content may be accessed. The first visual content and the modified version of the first visual content may be analyzed to determine a manipulation for the plurality of visual contents. The determined manipulation may be used to generate a manipulated visual content for each visual content of the plurality of visual contents. The generated manipulated visual contents may be provided.

In some examples, the first visual content may include at least an image captured using an image sensor, and the modified version of the first visual content may include the image after at least one manual modification. In some examples, each visual content of the plurality of visual contents may include at least a visual element corresponding to a particular brand and a visual element unrelated to the particular brand, and for each visual content of the plurality of visual contents the manipulated visual content corresponding to the visual content may include at least the visual element corresponding to the particular brand from the corresponding visual content and a manipulated version of the visual element unrelated to the particular brand. In one example, the first visual content may not include any visual element corresponding to the particular brand. In one example, the visual elements corresponding to the particular brands may include at least one of a logo corresponding to the particular brand, a product corresponding to the particular brand, and a visual element in a color scheme corresponding to the particular brand.

In some examples, each visual content of the plurality of visual contents may include at least a visual element corresponding to a particular brand, and generating the manipulated visual content for the visual content may include modifying the visual element corresponding to the particular brand.

In some examples, a convolution of at least part of the first visual content may be calculated, a convolution of at least part of the modified version of the first visual content may be calculated, and the calculated convolution of the at least part of the first visual content and the calculated convolution of the at least part of the modified version of the first visual content may be used to determine the manipulation for the plurality of visual contents.

In some examples, the first visual content and the modified version of the first visual content may be analyzed to determine a mathematical relation in a mathematical space between a mathematical object in the mathematical space corresponding to the first visual content and a mathematical object in the mathematical space corresponding to the modified version of the first visual content. The determined mathematical relation may be used to determine mathematical objects in the mathematical space corresponding to the manipulated visual contents. The determined mathematical objects in the mathematical space corresponding to the manipulated visual contents may be used to generate the manipulated visual contents. For example, the mathematical space may be a non-orientable space.

In some examples, the first visual content may include a person of a first ethnicity, the modified version of the first visual content may include a replacement of the person to a corresponding person of a second ethnicity, and the determined manipulation may include at least replacing people of the first ethnicity to corresponding people of the second ethnicity. In some examples, the first visual content may include a person of a first gender, the modified version of the first visual content may include a replacement of the person to a corresponding person of a second gender, and the determined manipulation may include at least replacing people of the first gender to corresponding people of the second gender. In some examples, the first visual content may include a person of a first age group, the modified version of the first visual content may include a replacement of the person to a corresponding person of a second age group, and the determined manipulation may include at least replacing people of the first age group to corresponding people of the second age group. In some examples, the first visual content may include a person at a first pose, the modified version of the first visual content may include a modification of the pose of the person to a second pose, and the determined manipulation may include at least modifying pose of people from the first pose to the second pose. In some examples, the first visual content may include a first product of a first family of products, the modified version of the first visual content may include a replacement of the first product to a corresponding product of a second family of products, and the determined manipulation may include at least replacing products of the first family of products with products of the second family of products. In some examples, the first visual content may include a product with a first logo appearing on the product, the modified version of the first visual content may include a replacement of the first logo to a second logo, and the determined manipulation may include at least replacing the first logo to the second logo when the first logo appears on products. In some examples, the first visual content may include a first landscape of a first type of landscapes, the modified version of the first visual content may include a replacement of the first landscape with a landscape of a second type of landscapes, and the determined manipulation may include at least replacing landscapes of the first type with landscapes of the second type.

In some examples, the first visual content may correspond to a first part of day, the modified version of the first visual content may correspond to a second part of day, and the determined manipulation may include changing visual characteristics corresponding to the first part of day to visual characteristics corresponding to the second part of day. In some examples, the first visual content may correspond to a first season, the modified version of the first visual content may correspond to a second season, and the determined manipulation may include changing visual characteristics corresponding to the first season to visual characteristics corresponding to the second season.

In one examples, systems, methods and non-transitory computer readable media for generating and orchestrating motion of visual contents are provided.

In some examples, a plurality of visual contents may be accessed. Data indicative of a layout of the plurality of visual contents in a user interface may be accessed. A sequence for the plurality of visual contents may be determined based on the layout. For each visual content of the plurality of visual contents, the visual content may be analyzed to generate a video clip including a motion of at least one object depicted in the visual content. A presentation of the plurality of visual contents in the user interface may be caused. The determined sequence for the plurality of visual contents may be used to orchestrate a series of playbacks of the generated video clips.

In some examples, the playback of each video clip may be placed in the user interface based on a position of the visual content corresponding to the video clip in the user interface. In some examples, the determined sequence for the plurality of visual contents may be configured to guide a user attention through the user interface. In some examples, the playback of a first video clip of the generated video clips may be configured to start after a completion of the playback of a second video clip of the generated video clips. In some examples, the playback of a first video clip of the generated video clips may be configured to start while the playback of a second video clip of the generated video clips occurs.

In some examples, each visual content of the plurality of visual contents may include at least a depiction of a product. In one example, each generated video clip may include a motion of the product depicted in the corresponding visual content. In one example, the determination of the sequence for the plurality of visual contents may be further based on prices corresponding to the products depicted in the visual contents. In one example, the determination of the sequence for the plurality of visual contents may be further based on historic sales data corresponding to the products depicted in the visual contents. In one example, information related to a product depicted in a visual content may be used to determine a length for the generated video clip corresponding to the visual content.

In some examples, the determination of the sequence for the plurality of visual contents may be further based on an analysis of the plurality of visual contents. In some examples, the determination of the sequence for the plurality of visual contents may be further based on a prospective viewer. In some examples, the determination of the sequence for the plurality of visual contents may be further based on dimensions associated with the visual contents.

In some examples, each visual content of the plurality of visual contents may be analyzed to determine a mathematical object corresponding to the visual content in a mathematical space, and the determination of the sequence for the plurality of visual contents may be further based on the mathematical objects corresponding to the plurality of visual contents. In one example, the mathematical space may be a non-orientable space.

In some examples, the layout may be used to determine a duration for each generated video clip. In some examples, the layout may be used to determine a direction of motion corresponding to each generated video clip. In some examples, a first generated video clip may include a person looking to a direction of a particular visual content based on the layout while refereeing to the particular visual content.

Consistent with other disclosed embodiments, non-transitory computer-readable storage media may store software program comprising data and/or computer implementable instructions. The computer implementable instructions, when executed by at least one processing device, may cause the at least one processing device to perform one or more of the methods and/or steps described herein.

The foregoing general description and the following detailed description are exemplary and explanatory only and are not restrictive of the claims.

BRIEF DESCRIPTION OF THE DRAWINGS

The accompanying drawings, which are incorporated in and constitute a part of this disclosure, illustrate various disclosed embodiments. In the drawings:

FIGS. 4A and 4B are flowcharts of exemplary methods for generating visual content consistent with aspects of a visual brand language.

FIGS. 8A and 8B are flowcharts of exemplary methods for generating looped video clips.

FIG. 9 is a flowchart of an exemplary method for optimizing visual contents.

DETAILED DESCRIPTION

Figure 1A:
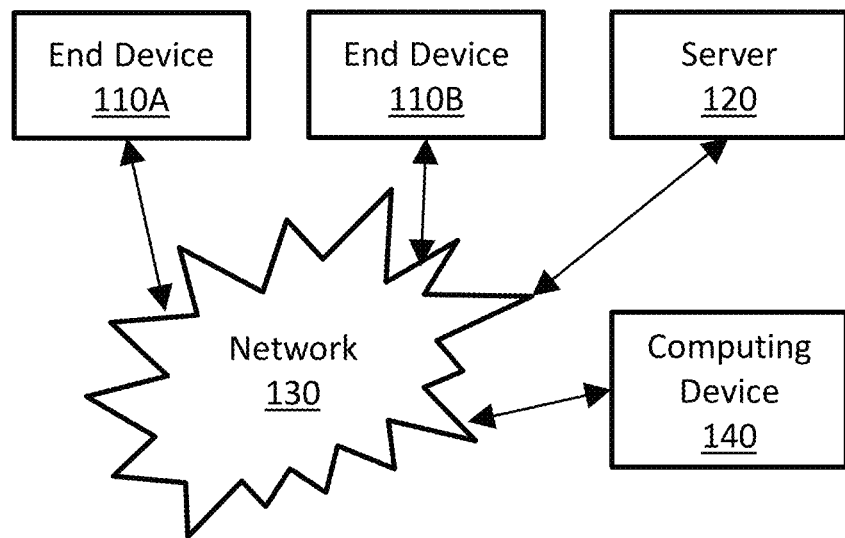
FIG. 1A is an illustration of an exemplary communication system.

Unless specifically stated otherwise, as apparent from the following discussions, it is appreciated that throughout the specification discussions utilizing terms such as "processing", "calculating", "computing", "determining", "generating", "setting", "configuring", "selecting", "defining", "applying", "obtaining", "monitoring", "providing", "identifying", "segmenting", "classifying", "analyzing", "associating", "extracting", "storing", "receiving", "transmitting", or the like, include action and/or processes of a computer that manipulate and/or transform data into other data, said data represented as physical quantities, for example such as electronic quantities, and/or said data representing the physical objects. The terms "computer", "processor", "controller", "processing unit", "computing device", and "processing module" should be expansively construed to cover any kind of electronic device, component or unit with data processing capabilities, including, by way of non-limiting example, a personal computer, a wearable computer, a tablet, a smartphone, a server, a computing system, a cloud computing platform, a communication device, a processor (for example, digital signal processor (DSP), an image signal processor (ISR), a microcontroller, a field programmable gate array (FPGA), an application specific integrated circuit (ASIC), a central processing unit (CPA), a graphics processing unit (GPU), a visual processing unit (VPU), and so on), possibly with embedded memory, a single core processor, a multi core processor, a core within a processor, any other electronic computing device, or any combination of the above.

The operations in accordance with the teachings herein may be performed by a computer specially constructed or programmed to perform the described functions.

As used herein, the phrase "for example," "such as", "for instance", "in one example", "in another example", "in a different example", "in some examples", "in an additional example", "in yet another example" and variants thereof describe non-limiting embodiments of the presently disclosed subject matter. Reference in the specification to "one case", "some cases", "other cases" or variants thereof means that a particular feature, structure or characteristic described in connection with the embodiment(s) may be included in at least one embodiment of the presently disclosed subject matter. Thus the appearance of the phrase "one case", "some cases", "other cases" or variants thereof does not necessarily refer to the same embodiment(s). As used herein, the term "and/or" includes any and all combinations of one or more of the associated listed items.

It is appreciated that certain features of the presently disclosed subject matter, which are, for clarity, described in the context of separate embodiments, may also be provided in combination in a single embodiment. Conversely, various features of the presently disclosed subject matter, which are, for brevity, described in the context of a single embodiment, may also be provided separately or in any suitable sub-combination.

The term "image sensor" is recognized by those skilled in the art and refers to any device configured to capture images, a sequence of images, videos, and so forth. This includes sensors that convert optical input into images, where optical input can be visible light (like in a camera), radio waves, microwaves, terahertz waves, ultraviolet light, infrared light, x-rays, gamma rays, and/or any other light spectrum. This also includes both 2D and 3D sensors. Examples of image sensor technologies may include: CCD, CMOS, NMOS, and so forth. 3D sensors may be implemented using different technologies, including: stereo camera, active stereo camera, time of flight camera, structured light camera, radar, range image camera, and so forth.

In embodiments of the presently disclosed subject matter, one or more stages illustrated in the figures may be executed in a different order and/or one or more groups of stages may be executed simultaneously and vice versa. The figures illustrate a general schematic of the system architecture in accordance embodiments of the presently disclosed subject matter. Each module in the figures can be made up of any combination of software, hardware and/or firmware that performs the functions as defined and explained herein. The modules in the figures may be centralized in one location or dispersed over more than one location.

It should be noted that some examples of the presently disclosed subject matter are not limited in application to the details of construction and the arrangement of the components set forth in the following description or illustrated in the drawings. The invention can be capable of other embodiments or of being practiced or carried out in various ways. Also, it is to be understood that the phraseology and terminology employed herein is for the purpose of description and should not be regarded as limiting.

In this document, an element of a drawing that is not described within the scope of the drawing and is labeled with a numeral that has been described in a previous drawing may have the same use and description as in the previous drawings.

The drawings in this document may not be to any scale. Different figures may use different scales and different scales can be used even within the same drawing, for example different scales for different views of the same object or different scales for the two adjacent objects.

FIG. 1A is an illustration of an exemplary communication system. In this example, the communication system may include: one or more end devices 110 (such as end device 110A, end device 110B, etc.), one or more servers (such as server 120), a communication network 130, and one or more other computing devices (such as computing device 140). In this example, end devices 110 may communicate with server 120, with computing device 140, with each other, and so forth. The communication may be using communication network 130 and/or directly. Possible implementations of an end device 110 and/or of server 120 and/or of computing device 140 may include computing device 200 as described in FIGS. 2A and 2B. In other example, an end device 110 and/or of server 120 and/or of computing device 140 may be implemented using a cloud platform, for example as a physical computing device or a virtual computing device in a cloud platform. Some other non-limiting examples of possible implementations of end device 110 may include a mobile phone, a smartphone, a tablet, a wearable computing device, a personal computer (PC), and so forth. In some examples, end devices 110 may communicate with server 120, with computing device 140, with each other, and so forth. Possible implementations of an end device 110 and/or of server 120 and/or of computing device 140 may connect to communication network 130 using a local router, directly, through another communication device, and so forth. Some non-limiting examples of communication network 130 may include the Internet, phone networks, cellular networks, satellite communication networks, private communication networks, virtual private networks (VPN), and so forth.

Figure 1B:
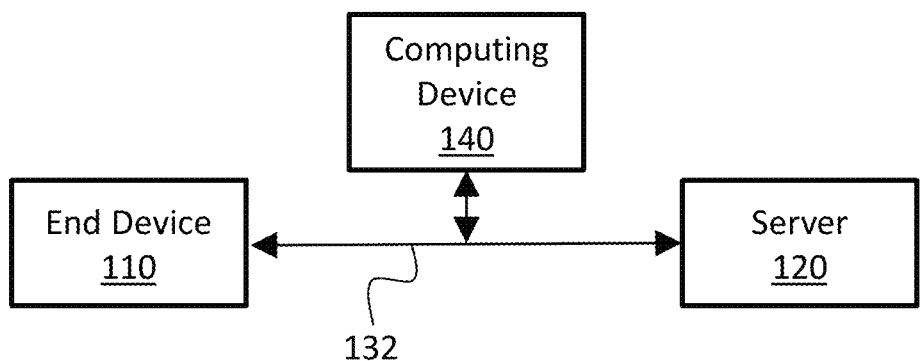
FIG. 1B is an illustration of an exemplary communication system.

FIG. 1B is an illustration of an exemplary communication system. In this example, end device 110 communicates with server 120 using a communication hardware 132. For example, end device 110 communicates with server 120 directly, through a different communication device, over a communication line, using a communication network (such as communication network 130), and so forth. In this example, another computing device 140 may observe and/or modify and/or block the communication between end device 110 and server 120. In one example, a communication line between end device 110 communicates and server 120 may be a direct communication line, may be a communication line through another device, may be a communication line over a communication network (such as communication network 130), and so forth.

FIGS. 1A and 1B illustrate some possible implementations of a communication system. In some embodiments, other communication systems that enable communication between end devices 110 may communicate and/or server 120 and/or computing device 140 may be used.

Figure 2A:
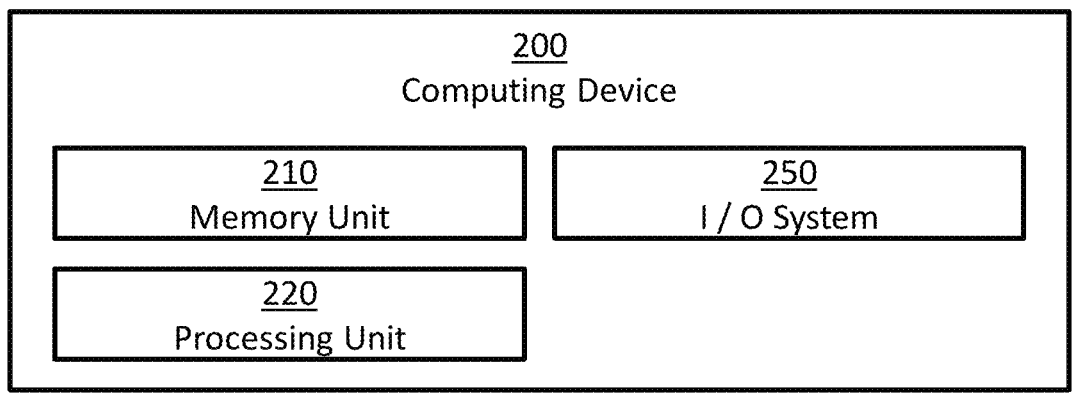
FIG. 2A is a simplified block diagram of an example for one possible implementation of a computing device.

FIG. 2A is a simplified block diagram of an example for one possible implementation of a computing device. In this example, computing device 200 may comprise: one or more memory units 210, one or more processing units 220, and input/output system 250. In some implementations, computing device 200 may comprise additional components, while some components listed above may be excluded.

Figure 2B:
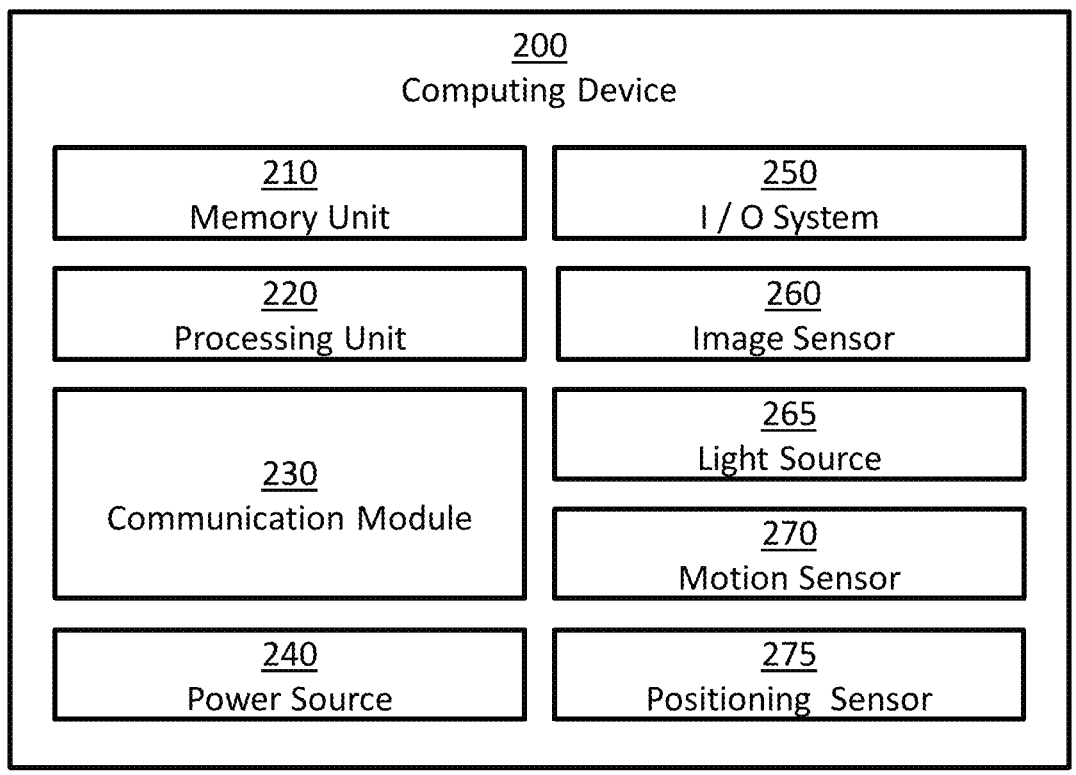
FIG. 2B is a simplified block diagram of an example for one possible implementation of a computing device.

FIG. 2B is a block diagram illustrating a possible implementation of computing device 200. In this example, computing device 200 may comprise: one or more memory units 210, one or more processing units 220, one or more communication modules 230, one or more power sources 240, input/output system 250, one or more image sensors 260, one or more light sources 265, one or more motion sensors 270, and one or more positioning sensors 275. In some implementations, computing device 200 may comprise additional components, while some components listed above may be excluded. For example, in some implementations computing device 200 may also comprise at least one of the following: one or more user input devices, one or more output devices, and so forth. In another example, in some implementations at least one of the following may be excluded from computing device 200: memory units 210, communication modules 230, power sources 240, input/output system 250, image sensors 260, light sources 265, motion sensors 270, and positioning sensors 275.

In some embodiments, one or more power sources 240 may be configured to power computing device 200. Possible non-limiting implementation examples of power sources 240 may include: one or more electric batteries, one or more capacitors, one or more connections to external power sources, one or more power convertors, any combination of the above, and so forth.

In some embodiments, the one or more processing units 220 may be configured to execute software programs. For example, processing units 220 may be configured to execute software programs stored on the memory units 210. In some cases, the executed software programs may store information in memory units 210. In some cases, the executed software programs may retrieve information from the memory units 210. Possible non-limiting implementation examples of the processing units 220 may include one or more single core processors, one or more multicore processors, one or more controllers, one or more application processors, one or more system on a chip processors, one or more central processing units, one or more graphical processing units, one or more neural processing units, any combination of the above, and so forth.

In some embodiments, the one or more communication modules 230 may be configured to receive and transmit information. For example, control signals may be transmitted and/or received through communication modules 230. In another example, information received though communication modules 230 may be stored in memory units 210. In an additional example, information retrieved from memory units 210 may be transmitted using communication modules 230. In another example, input data may be transmitted and/or received using communication modules 230. Examples of such input data may include: input data inputted by a user using user input devices; information captured using one or more sensors; and so forth. Examples of such sensors may include: audio sensors, image sensors 260, motion sensors 270, positioning sensors 275, temperature sensors, and so forth.

In some embodiments, the input/output system 250 may include or be configured to connect with input and/or output devices, such as keyboards, computer mouses, touch pads, touch screens, gesture recognition systems, image sensors, audio sensors, visual indicators (such as LED visual indicators), audio speakers, audio beepers, display screens, extended reality systems, and so forth. In some examples, input and/or output devices may be configured to generate digital signal based on inputs from a user, a person, or an environment, and/or to generate physical output to a user, a person or in an environment based on digital signals. In one example, the input/output system 250 may be configured to store and/or receive such digital signals from memory unit 210. In one example, the input/output system 250 may be configured to receive and/or provide such digital signals from and/or to processing unit 220 and/or communication module 230.

In some embodiments, the one or more image sensors 260 may be configured to capture visual information by converting light to: image data, images, a sequence of images, videos, 3D images, a sequence of 3D images, a 3D videos, and so forth. In some examples, the captured visual information may be stored in memory units 210. In some additional examples, the captured visual information may be transmitted using communication modules 230, for example to other computerized devices. In some examples, processing units 220 may control the above processes. For example, processing units 220 may control at least one of: capturing of the visual information, storing the captured visual information, transmitting of the captured visual information, analysis of the captured visual information, and so forth. In some cases, the captured visual information may be processed by processing units 220. For example, the captured visual information may be compressed by processing units 220; possibly followed: by storing the compressed captured visual information in memory units 210; by transmitted the compressed captured visual information using communication modules 230; and so forth. In another example, the captured visual information may be processed in order to: detect objects, detect events, detect action, detect face, detect people, recognize person, and so forth.

In some embodiments, the one or more light sources 265 may be configured to emit light, for example in order to enable better image capturing by image sensors 260. In some examples, the emission of light may be coordinated with the capturing operation of image sensors 260. In some examples, the emission of light may be continuous. In some examples, the emission of light may be performed at selected times. The emitted light may be visible light, infrared light, x-rays, gamma rays, and/or in any other light spectrum. In some examples, image sensors 260 may capture light emitted by light sources 265, for example in order to capture 3D images and/or 3D videos using active stereo method.

In some embodiments, the one or more motion sensors 270 may be configured to perform at least one of the following: detect motion of objects in the environment of computing device 200; measure the velocity of objects in the environment of computing device 200; measure the acceleration of objects in the environment of computing device 200; detect motion of computing device 200; measure the velocity of computing device 200; measure the acceleration of computing device 200; and so forth. In some implementations, the one or more motion sensors 270 may comprise one or more accelerometers configured to detect changes in proper acceleration and/or to measure proper acceleration of computing device 200. In some implementations, the one or more motion sensors 270 may comprise one or more gyroscopes configured to detect changes in the orientation of computing device 200 and/or to measure information related to the orientation of computing device 200. In some implementations, motion sensors 270 may be implemented using image sensors 260, for example by analyzing images captured by image sensors 260 to perform at least one of the following tasks: track objects in the environment of computing device 200; detect moving objects in the environment of computing device 200; measure the velocity of objects in the environment of computing device 200; measure the acceleration of objects in the environment of computing device 200; measure the velocity of computing device 200, for example by calculating the egomotion of image sensors 260; measure the acceleration of computing device 200, for example by calculating the egomotion of image sensors 260; and so forth. In some implementations, motion sensors 270 may be implemented using image sensors 260 and light sources 265, for example by implementing a LIDAR using image sensors 260 and light sources 265. In some implementations, motion sensors 270 may be implemented using one or more RADARs. In some examples, information captured using motion sensors 270: may be stored in memory units 210, may be processed by processing units 220, may be transmitted and/or received using communication modules 230, and so forth.

In some embodiments, the one or more positioning sensors 275 may be configured to obtain positioning information of computing device 200, to detect changes in the position of computing device 200, and/or to measure the position of computing device 200. In some examples, positioning sensors 275 may be implemented using one of the following technologies: Global Positioning System (GPS), GLObal NAvigation Satellite System (GLONASS), Galileo global navigation system, BeiDou navigation system, other Global Navigation Satellite Systems (GNSS), Indian Regional Navigation Satellite System (IRNSS), Local Positioning Systems (LPS), Real-Time Location Systems (RTLS), Indoor Positioning System (IPS), Wi-Fi based positioning systems, cellular triangulation, and so forth. In some examples, information captured using positioning sensors 275 may be stored in memory units 210, may be processed by processing units 220, may be transmitted and/or received using communication modules 230, and so forth.

In some embodiments, a method, such as methods 400, 420, 600, 800, 820, 900, 1000 and 1200, may comprise one or more steps. In some examples, these methods, as well as all individual steps therein, may be performed by various aspects of end devices 110, server 120, computing device 140, computing device 200, and so forth. For example, a system comprising of at least one processor, such as processing units 220, may perform any of these methods as well as all individual steps therein, for example by processing units 220 executing software instructions stored within memory units 210. In some examples, these methods, as well as all individual steps therein, may be performed by a dedicated hardware. In some examples, computer readable medium, such as a non-transitory computer readable medium, may store data and/or computer implementable instructions for carrying out any of these methods as well as all individual steps therein. Some non-limiting examples of possible execution manners of a method may include continuous execution (for example, returning to the beginning of the method once the method normal execution ends), periodically execution, executing the method at selected times, execution upon the detection of a trigger (some non-limiting examples of such trigger may include a trigger from a user, a trigger from another process, a trigger from an external device, etc.), and so forth.

In some embodiments, machine learning algorithms (also referred to as machine learning models in the present disclosure) may be trained using training examples, for example by Step 402, Step 406, Step 822 and Step 904, and in the cases described below. Some non-limiting examples of such machine learning algorithms may include classification algorithms, data regressions algorithms, image segmentation algorithms, visual detection algorithms (such as object detectors, face detectors, person detectors, motion detectors, edge detectors, etc.), visual recognition algorithms (such as face recognition, person recognition, object recognition, etc.), speech recognition algorithms, mathematical embedding algorithms, natural language processing algorithms, support vector machines, random forests, nearest neighbors algorithms, deep learning algorithms, artificial neural network algorithms, convolutional neural network algorithms, recurrent neural network algorithms, linear machine learning models, non-linear machine learning models, ensemble algorithms, and so forth. For example, a trained machine learning algorithm may comprise an inference model, such as a predictive model, a classification model, a data regression model, a clustering model, a segmentation model, an artificial neural network (such as a deep neural network, a convolutional neural network, a recurrent neural network, etc.), a random forest, a support vector machine, and so forth. In some examples, the training examples may include example inputs together with the desired outputs corresponding to the example inputs. Further, in some examples, training machine learning algorithms using the training examples may generate a trained machine learning algorithm, and the trained machine learning algorithm may be used to estimate outputs for inputs not included in the training examples. In some examples, engineers, scientists, processes and machines that train machine learning algorithms may further use validation examples and/or test examples. For example, validation examples and/or test examples may include example inputs together with the desired outputs corresponding to the example inputs, a trained machine learning algorithm and/or an intermediately trained machine learning algorithm may be used to estimate outputs for the example inputs of the validation examples and/or test examples, the estimated outputs may be compared to the corresponding desired outputs, and the trained machine learning algorithm and/or the intermediately trained machine learning algorithm may be evaluated based on a result of the comparison. In some examples, a machine learning algorithm may have parameters and hyper parameters, where the hyper parameters may be set manually by a person or automatically by an process external to the machine learning algorithm (such as a hyper parameter search algorithm), and the parameters of the machine learning algorithm may be set by the machine learning algorithm based on the training examples. In some implementations, the hyper-parameters may be set based on the training examples and the validation examples, and the parameters may be set based on the training examples and the selected hyper-parameters. For example, given the hyper-parameters, the parameters may be conditionally independent of the validation examples.

In some embodiments, trained machine learning algorithms (also referred to as machine learning models and trained machine learning models in the present disclosure) may be used to analyze inputs and generate outputs, for example by Step 402, Step 406, Step 822 and Step 904, and in the cases described below. In some examples, a trained machine learning algorithm may be used as an inference model that when provided with an input generates an inferred output. For example, a trained machine learning algorithm may include a classification algorithm, the input may include a sample, and the inferred output may include a classification of the sample (such as an inferred label, an inferred tag, and so forth). In another example, a trained machine learning algorithm may include a regression model, the input may include a sample, and the inferred output may include an inferred value corresponding to the sample. In yet another example, a trained machine learning algorithm may include a clustering model, the input may include a sample, and the inferred output may include an assignment of the sample to at least one cluster. In an additional example, a trained machine learning algorithm may include a classification algorithm, the input may include an image, and the inferred output may include a classification of an item depicted in the image. In yet another example, a trained machine learning algorithm may include a regression model, the input may include an image, and the inferred output may include an inferred value corresponding to an item depicted in the image (such as an estimated property of the item, such as size, volume, age of a person depicted in the image, cost of a product depicted in the image, and so forth). In an additional example, a trained machine learning algorithm may include an image segmentation model, the input may include an image, and the inferred output may include a segmentation of the image. In yet another example, a trained machine learning algorithm may include an object detector, the input may include an image, and the inferred output may include one or more detected objects in the image and/or one or more locations of objects within the image. In some examples, the trained machine learning algorithm may include one or more formulas and/or one or more functions and/or one or more rules and/or one or more procedures, the input may be used as input to the formulas and/or functions and/or rules and/or procedures, and the inferred output may be based on the outputs of the formulas and/or functions and/or rules and/or procedures (for example, selecting one of the outputs of the formulas and/or functions and/or rules and/or procedures, using a statistical measure of the outputs of the formulas and/or functions and/or rules and/or procedures, and so forth).

In some embodiments, artificial neural networks may be configured to analyze inputs and generate corresponding outputs, for in the cases described herein. Some non-limiting examples of such artificial neural networks may comprise shallow artificial neural networks, deep artificial neural networks, feedback artificial neural networks, feed forward artificial neural networks, autoencoder artificial neural networks, probabilistic artificial neural networks, time delay artificial neural networks, convolutional artificial neural networks, recurrent artificial neural networks, long short term memory artificial neural networks, and so forth. In some examples, an artificial neural network may be configured manually. For example, a structure of the artificial neural network may be selected manually, a type of an artificial neuron of the artificial neural network may be selected manually, a parameter of the artificial neural network (such as a parameter of an artificial neuron of the artificial neural network) may be selected manually, and so forth. In some examples, an artificial neural network may be configured using a machine learning algorithm. For example, a user may select hyper-parameters for the an artificial neural network and/or the machine learning algorithm, and the machine learning algorithm may use the hyper-parameters and training examples to determine the parameters of the artificial neural network, for example using back propagation, using gradient descent, using stochastic gradient descent, using mini-batch gradient descent, and so forth. In some examples, an artificial neural network may be created from two or more other artificial neural networks by combining the two or more other artificial neural networks into a single artificial neural network.

Some non-limiting examples of image data may include images, grayscale images, color images, 2D images, 3D images, videos, 2D videos, 3D videos, frames, footages, data derived from other image data, and so forth. In some embodiments, analyzing image data (for example by the methods, steps and modules described herein, such as Step 402, Step 406, Step 422, Step 426, Step 802, Step 804, Step 822, Step 902, Step 904, Step 1002, Step 1004, Step 1006, Step 1202, Step 1206 and Step 1208) may comprise analyzing the image data to obtain a preprocessed image data, and subsequently analyzing the image data and/or the preprocessed image data to obtain the desired outcome. One of ordinary skill in the art will recognize that the followings are examples, and that the image data may be preprocessed using other kinds of preprocessing methods. In some examples, the image data may be preprocessed by transforming the image data using a transformation function to obtain a transformed image data, and the preprocessed image data may comprise the transformed image data. For example, the transformed image data may comprise one or more convolutions of the image data. For example, the transformation function may comprise one or more image filters, such as low-pass filters, high-pass filters, band-pass filters, all-pass filters, and so forth. In some examples, the transformation function may comprise a nonlinear function. In some examples, the image data may be preprocessed by smoothing at least parts of the image data, for example using Gaussian convolution, using a median filter, and so forth. In some examples, the image data may be preprocessed to obtain a different representation of the image data. For example, the preprocessed image data may comprise: a representation of at least part of the image data in a frequency domain; a Discrete Fourier Transform of at least part of the image data; a Discrete Wavelet Transform of at least part of the image data; a time/frequency representation of at least part of the image data; a representation of at least part of the image data in a lower dimension; a lossy representation of at least part of the image data; a lossless representation of at least part of the image data; a time ordered series of any of the above; any combination of the above; and so forth. In some examples, the image data may be preprocessed to extract edges, and the preprocessed image data may comprise information based on and/or related to the extracted edges. In some examples, the image data may be preprocessed to extract image features from the image data. Some non-limiting examples of such image features may comprise information based on and/or related to: edges; corners; blobs; ridges; Scale Invariant Feature Transform (SIFT) features; temporal features; and so forth. In some examples, analyzing the image data may include calculating at least one convolution of at least a portion of the image data, and using the calculated at least one convolution to calculate at least one resulting value and/or to make determinations, identifications, recognitions, classifications, and so forth.

In some embodiments, analyzing image data (for example by the methods, steps and modules described herein, such as Step 402, Step 406, Step 422, Step 426, Step 802, Step 804, Step 822, Step 902, Step 904, Step 1002, Step 1004, Step 1006, Step 1202, Step 1206 and Step 1208) may comprise analyzing the image data and/or the preprocessed image data using one or more rules, functions, procedures, artificial neural networks, object detection algorithms, face detection algorithms, visual event detection algorithms, action detection algorithms, motion detection algorithms, background subtraction algorithms, inference models, and so forth. Some non-limiting examples of such inference models may include: an inference model preprogrammed manually; a classification model; a regression model; a result of training algorithms, such as machine learning algorithms and/or deep learning algorithms, on training examples, where the training examples may include examples of data instances, and in some cases, a data instance may be labeled with a corresponding desired label and/or result; and so forth. In some embodiments, analyzing image data (for example by the methods, steps and modules described herein, such as Step 402, Step 406, Step 422, Step 426, Step 802, Step 804, Step 822, Step 902, Step 904, Step 1002, Step 1004, Step 1006, Step 1202, Step 1206 and Step 1208) may comprise analyzing pixels, voxels, point cloud, range data, etc. included in the image data.

In some examples, objects may be removed from a visual content (for example by the methods, steps and modules described herein). In one example, segmentation data (such as binary mask, alpha matte, probabilistic mask, etc.) of the object in a visual content may be obtained. For example, the segmentation data may be read from memory, received from an external device, received from a user, determined by analyzing the visual content (for example with an object segmentation algorithm), and so forth. Further, the segmentation data may be used to remove the object from the visual data, and the area previously depicting the object in the visual content may be filled, for example using inpainting algorithms, using interpolation algorithms, by stitching another object over it, and so forth. In some examples, an object may be inserted to a visual content (for example by the methods, steps and modules described herein). For example, visual matting algorithms may be used to insert the object to the visual content. In another example, the object may be stitched at a selected position in the visual content using a visual stitching algorithm. In some examples, an object may be moved in a visual content. For example, the object may be removed from its original position in the visual content (for example, as described above), and may be inserted to the visual content at a new positon (for example, as described above), to create the visual motion of the object from the original position to the new position. In some examples, visual appearance of an object may be modified in a visual content. For example, the original depiction of the object may be removed from the visual content (for example, as described above), and a new depiction of the object may be inserted to the visual content (for example, as described above), to create the modification of the visual appearance of the object in the visual content.

It is to be understood that substantially visually similar includes visually identical. For example, two substantially visually similar visual contents may be identical visual contents, two substantially visually similar objects may be identical visual objects, and so forth. It is to be understood that substantially identical includes identical. For example, two substantially identical directions may be identical directions.

In many cases, visual contents (such as photos, videos, illustrations, icons, animations, etc.) need to be modified or originally generated to be consistent with aspects of a visual language, such as a visual brand language. For example, a visual content may be received from an external source, such as generic visual content (for example from stock images and/or videos), and the visual content may need to be adjusted to be compatible with the visual brand language before it can be used. In another example, generating a visual content may need to ensure that the generated visual content is compatible with the visual brand language. Manual adjustment and generation of visual contents may be time consuming and erroneous, and may end with insufficient adherence. Moreover, due to limitations of the manual abilities, the amount and type of visual contents that may be adjusted and/or generated, and thereafter used, is limited. For example, the visual contents may be limited to still images, while videos may be preferred. Therefore, it is desired to automate the modification and generation of visual content while ensuring compatibility with the visual brand language.

Figure 3A:
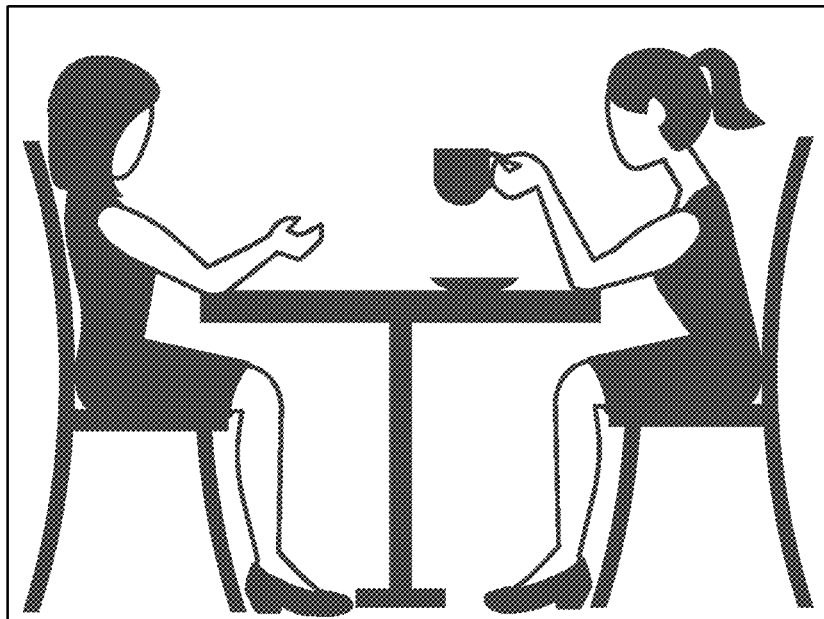
FIGS. 3A, 3B, 3C, 3D, 3E and 3F are illustrations of exemplary visual contents.
Figure 3B:
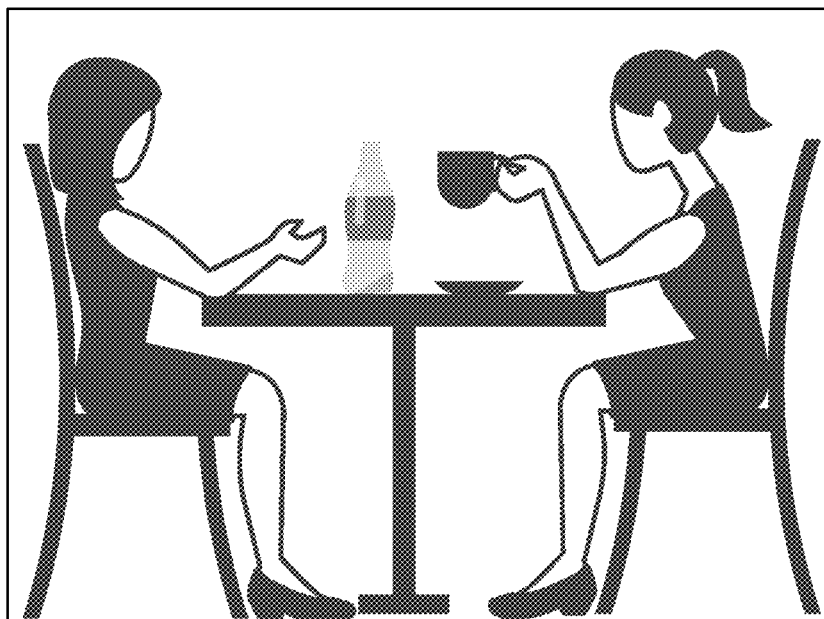
Figure 3C:
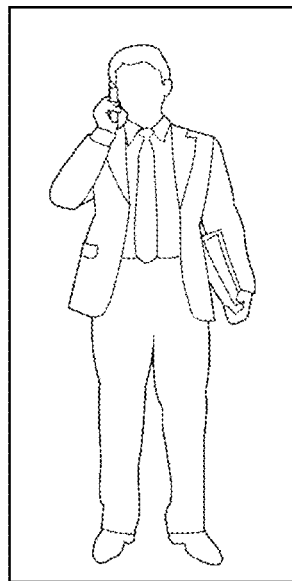
Figure 3D:
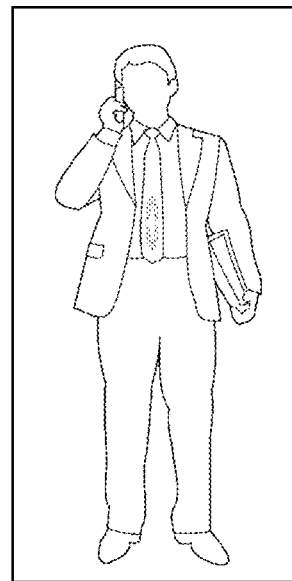
Figure 3E:
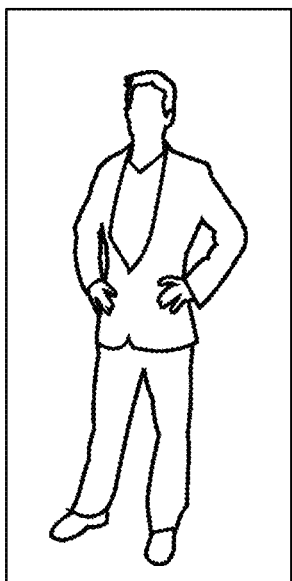
Figure 3F:
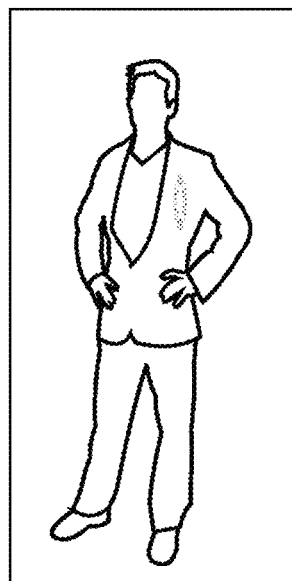

FIGS. 3A, 3B, 3C, 3D, 3E and 3F are illustrations of exemplary visual contents. FIG. 3A is an illustration of an exemplary visual content depicting two friends sitting around a table. FIG. 3B is an illustration of a modified version of the visual content of FIG. 3A. In this example, the visual content of FIG. 3B includes a bottle consistent with aspects of a visual brand language placed on the table. FIG. 3C is an illustration of an exemplary visual content depicting a person wearing a suit and a tie. FIG. 3D is an illustration of a modified version of the visual content of FIG. 3C. In this example, in the visual content of FIG. 3D a logo consistent with aspects of a visual brand language appears on the tie, and the color and/or texture of the suit may be modified based on aspects of a visual brand language. FIG. 3E is an illustration of an exemplary visual content depicting a person wearing a jacket. FIG. 3F is an illustration of a modified version of the visual content of FIG. 3E. In this example, in the visual content of FIG. 3F a logo consistent with aspects of a visual brand language appears on the jacket, and the color and/or texture of the jacket may be modified based on aspects of a visual brand language.

Figure 4A:
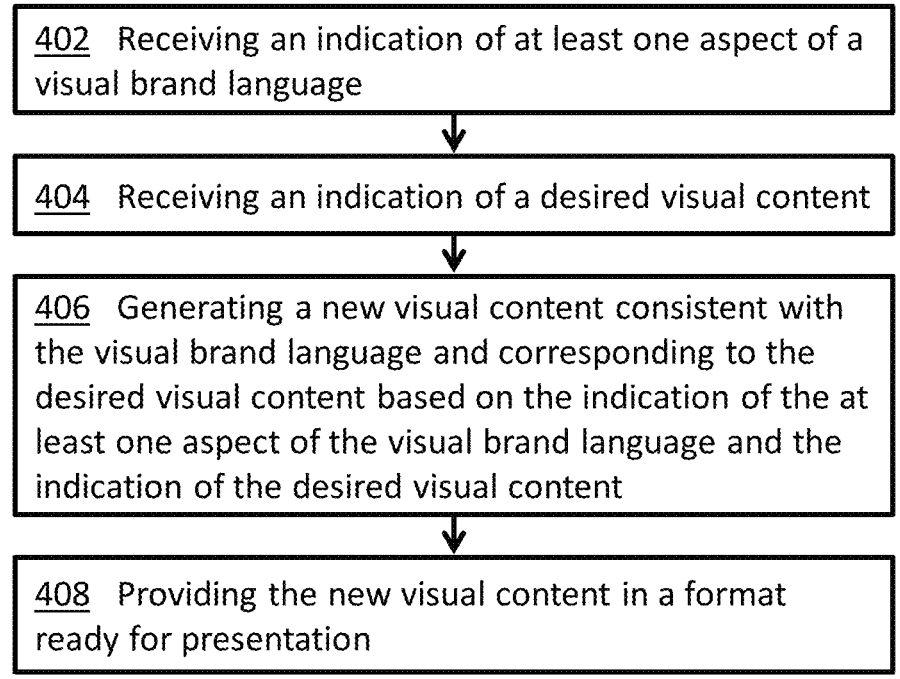

FIG. 4A is a flowchart of an exemplary method 400 for generating visual content consistent with aspects of a visual brand language. In this example, method 400 may comprise receiving an indication of at least one aspect of a visual brand language (Step 402); receiving an indication of a desired visual content (Step 404); generating a new visual content consistent with the visual brand language and corresponding to the desired visual content, for example based on the indication of the at least one aspect of the visual brand language and/or the indication of the desired visual content (Step 406); and providing the new visual content in a format ready for presentation (Step 408). In one example, method 400 may modify the visual content of FIG. 3A to the visual content of FIG. 3B, for example by adding the bottle consistent with aspects of a visual brand language placed on the table. In one example, method 400 may modify the visual content of FIG. 3C to the visual content of FIG. 3D, for example by inserting the logo consistent with aspects of a visual brand language on the tie, by modifying the color and/or texture of the suit based on aspects of a visual brand language, and so forth. In one example, method 400 may modify the visual content of FIG. 3E to the visual content of FIG. 3F, for example by inserting the logo consistent with aspects of a visual brand language on the jacket, by modifying the color and/or texture of the jacket based on aspects of a visual brand language, and so forth.

A visual brand language is a unique set of design elements, design principles, attributes and/or personality associated with a brand. The visual brand language may directly and/or subliminally communicate brand's values and personality through compelling imagery and design style. Some non-limiting examples of aspects of a visual brand language may include a brand personality, desired traits of the brand, product attributes, design principles (such as specific directions and/or objectives for designing a product, a platform, a media content, etc.), signature elements (such as shape, color, material, finish, logo, light, sound, typography, composition, etc.), and so forth.

In some examples, Step 402 may comprise receiving an indication of at least one aspect of a visual brand language. For example, receiving the indication of the at least one aspect of the visual brand language may include at least one of reading the indication from memory, receiving the indication from an external device, receiving the indication from a user (for example, through a user interface), determining the at least one aspect of the visual brand language by analyzing data as described below, and so forth.

In some examples, the indication of the at least one aspect of the visual brand language received by Step 402 may be based on an analysis of a visual style guide corresponding to the brand. In one example, Step 402 may further comprise analyzing the visual style guide corresponding to the brand to determine the indication of the at least one aspect of the visual brand language. A visual style guide, whether part of a general style guide or not, is set of standards for designing visual contents. The visual style guide may be configured to ensure consistency within a visual content and/or across multiple visual contents. The visual style guide may include requirements and/or recommendations on visual composition, typography, shapes, colors, materials, finishes, logos, light, and so forth. In some examples, the visual style guide may include textual information. The textual information may be analyzed to using a Natural Language Processing (NLP) model configured to determine aspects of a visual brand language from textual information. One non-limiting example of such NLP model is a machine learning model trained using trained examples to determine aspects of a visual brand language from textual information. An example of such training example may include a sample textual information from a sample visual style guide, together with an aspect of a visual brand language corresponding to the sample textual information. In some examples, the visual style guide may include one or more versions of a logo, for example together with a rule specifying what version of the logo need to be used in different situations. The visual style guide may be analyzed to identify the versions of the logo and the rule specifying what version of the logo need to be used in different situations, and the aspects of a visual brand language from textual information may be based on the identified versions of the logo and/or the rule specifying what version of the logo need to be used in different situations. In some examples, the visual style guide may include one or more font configurations, for example together with a rule specifying what font configuration need to be used in different situations. The visual style guide may be analyzed to identify the font configurations and the rule specifying what font configuration need to be used in different situations, and the aspects of a visual brand language from textual information may be based on the identified font configurations and/or the rule specifying what font configuration need to be used in different situations.

In some examples, the indication of the at least one aspect of the visual brand language received by Step 402 may be based on an analysis of at least one of a website corresponding to the brand, a social network profile corresponding to the brand and a user interface corresponding to the brand. In one example, Step 402 may further comprise analyzing at least one of the website corresponding to the brand, the social network profile corresponding to the brand and the user interface corresponding to the brand to determine the indication of the at least one aspect of the visual brand language. For example, a logo or a font included in at least one of the website, social network profile and user interface may be identified by the analysis, and the aspects of the visual brand language may be based on the identified logo and/or font. In another example, a color scheme may be determined based on the analysis of at least one of the website, social network profile and user interface, and the aspects of the visual brand language may be based on the color scheme.

In some examples, the indication of the at least one aspect of the visual brand language received by Step 402 may be based on an analysis of historic visual contents corresponding to the brand. For example, Step 402 may further comprise analyzing the historic visual contents corresponding to the brand to determine the indication of the at least one aspect of the visual brand language. In one example, the historic visual contents may be part of a marketing collateral corresponding to the brand. In one example, a logo or a font included in the historic visual contents may be identified by the analysis, and the aspects of the visual brand language may be based on the identified logo and/or font. In another example, a color scheme may be determined based on the analysis of the historic visual contents, and the aspects of the visual brand language may be based on the color scheme.

In some examples, the indication of the at least one aspect of the visual brand language received by Step 402 may be based on an analysis a plurality of responses of different people to a questionnaire (for example, on an analysis of a survey). In one example, Step 402 may further comprise analyzing the plurality of responses of the different people to the questionnaire (or the survey) to determine the indication of the at least one aspect of the visual brand language. For example, the analysis of the responses to the questionnaire may indicate that the different people associate the brand with a particular color scheme, and the aspects of the visual brand language may be based on the color scheme. In another example, the analysis of the responses to the questionnaire may indicate that the different people reacts more positively to a first font in comparison to a second font, and in response the aspects of the visual brand language may be based on the first font.

In some examples, Step 404 may comprise receiving an indication of a desired visual content. For example, receiving the indication of the desired visual content may include at least one of reading the indication from memory, receiving the indication from an external device, receiving the indication from a user (for example, through a user interface), determining the indication by analyzing data as described below, and so forth. In one example, the indication of the desired visual content may include at least one of a textual description of the desired visual content, a category of the desired visual content (such as 'people', 'animals', 'plants', 'retail', 'scenery', 'family', 'friends', etc.), an attribute of the desired visual content (such as 'outdoor', 'indoor', objects depicted in the desired visual content, desired color scheme, desired aspect ratio, desired size, desired length, etc.), examples of desired visual contents, examples of undesired visual contents, indication of a level of desirability of each one of a plurality of sample visual contents, indication of desired portions and/or undesired portions of a sample visual content, and so forth.

In some examples, Step 406 may comprise generating a new visual content consistent with the visual brand language and corresponding to the desired visual content based on the indication of the at least one aspect of the visual brand language received by Step 402 and the indication of the desired visual content by Step 404. Some non-limiting examples of such new visual content may include an image, a 2-dimensional image, a 3-dimensional image, a video clip, a 2-dimensional video clip, a 3-dimensional video clip, an animation, a 3-dimensional animation, a 2-dimensional animation, an illustration, a 2-dimensional illustration, a 3-dimensional illustration, and so forth. In one example, Step 406 may use method 420 described below to generate the new visual content consistent with the visual brand language and corresponding to the desired visual content based on the indication of the at least one aspect of the visual brand language received by Step 402 and the indication of the desired visual content by Step 404.

In some examples, Step 406 may use a generative adversarial network to generate the new visual content consistent with the visual brand language and corresponding to the desired visual content. In one example, Step 406 may select a first value based on the indication of the at least one aspect of the visual brand language (for example, using a regression model, using a function of one or more values included in the at least one aspect of the visual brand language, and so forth), and may use a conditional generative adversarial network with the first value as an input condition to generate the new visual content consistent with the visual brand language and corresponding to the desired visual content. In some examples, Step 406 may select a particular value based on the indication of the desired visual content (for example, using a regression model, using a function of one or more values included in the indication of the desired visual content, and so forth), and may use a conditional generative adversarial network with the particular value as an input condition to generate the new visual content consistent with the visual brand language and corresponding to the desired visual content.

In some examples, the indication of the desired visual content received by Step 404 may include an indication of an original visual content, and in Step 406 the generation of the new visual content consistent with the visual brand language and corresponding to the desired visual content may include a modification of at least part of the original visual content according to the visual brand language. For example, a machine learning model may be trained using training examples to modify visual contents according to visual brand languages. An example of such training example may include a sample visual content and a sample visual brand language, together with a desired modification of the sample visual content corresponding to the sample visual brand language. In one example, Step 406 may use the trained machine learning model to modify the at least part of the original visual content according to the visual brand language.

In some examples, the indication of the desired visual content received by Step 404 may include an indication of an original visual content, and in Step 406 the generation of the new visual content consistent with the visual brand language and corresponding to the desired visual content may include an insertion of an object corresponding to the visual brand language to the original visual content. For example, Step 406 may select the object of a plurality of alternative objects included in or corresponding to the visual brand language. In another example, Step 406 may insert the object the original visual content using a visual mating algorithm.

In some examples, the indication of the desired visual content received by Step 404 may include an indication of an original visual content. In some example, Step 406 may calculate a convolution of at least part of the original visual content. In one example, in response to a first value of the calculated convolution, Step 406 may generate a first visual content consistent with the visual brand language and corresponding to the desired visual content, and in response to a second value of the calculated convolution, Step 406 may generate a second visual content consistent with the visual brand language and corresponding to the desired visual content. The second visual content may differ from the first visual content.

In some examples, Step 406 may further base the generation of the new visual content consistent with the visual brand language and corresponding to the desired visual content on a target audience. In one example, the target audience may correspond to at least one of a geographical region, an age group, an industry, a gender, an ethnicity, and a sentiment. For example, in response to a first target audience, Step 406 may generate a first visual content consistent with the visual brand language and corresponding to the desired visual content, and in response to a second target audience, Step 406 may generate a second visual content consistent with the visual brand language and corresponding to the desired visual content. The second visual content may differ from the first visual content.

In some examples, method 400 may further comprise receiving an indication of a relation between a plurality of historic visual contents and historic impact. For example, receiving the indication of the relation may comprise at least one of reading the indication from memory, receiving the indication from an external device, analysis of historic data, and so forth. In one example, Step 406 may further base the generation of the new visual content consistent with the visual brand language and corresponding to the desired visual content on the relation. For example, in response to a first relation, Step 406 may generate a first visual content consistent with the visual brand language and corresponding to the desired visual content, and in response to a second relation, Step 406 may generate a second visual content consistent with the visual brand language and corresponding to the desired visual content. The second visual content may differ from the first visual content.

In some examples, Step 408 may comprise providing the new visual content in a format ready for presentation. For example, providing the new visual content in the format ready for presentation may include at least one of storing the new visual content in the format ready for presentation in memory, transmitting the new visual content in the format ready for presentation to an external device, and so forth. A format ready for presentation may include a format that other processes and/or other devices may use to present the visual content. Some non-limiting examples of such format ready for presentation may include image file formats, video file formats, standard formats, proprietary formats, non-compressed formats, compressed formats, lossless compressed formats, lossy compressed formats, vector formats, 2 dimensional formats, 3 dimensional formats, and so forth. In one non-limiting example, providing the new visual content in the format ready for presentation may include providing the new visual content to a display controller, for example by storing it in a memory shared with the display controller or by transmitting it to the display controller (for example, over a bus), in a format that the display controller is configured to receive for presentation of visual content. Further, the display controller may cause the presentation of the new visual content, for example in response to and/or using the provided information.

In some examples, the visual brand language of Step 402 may correspond to a particular brand. The indication of the desired visual content received by Step 404 may include an indication of an original visual content. The original visual content may include at least a visual element corresponding to the particular brand and a visual element unrelated to the particular brand. In some examples, the new visual content consistent with the visual brand language and corresponding to the desired visual content generated by Step 406 may include at least the visual element corresponding to the particular brand and a manipulated version of the visual element unrelated to the particular brand. For example, Step 406 may comprise: analyzing the original visual content to identify the visual element corresponding to the particular brand and the visual element unrelated to the particular brand (for example, using a semantic segmentation algorithm, using Step 422 described below, etc.), manipulating the visual element unrelated to the particular brand to obtain the manipulated version of the visual element unrelated to the particular brand (for example, using a visual transformation function), and generating the new visual content consistent with the visual brand language and corresponding to the desired visual content to include at least the visual element corresponding to the particular brand and the manipulated version of the visual element unrelated to the particular brand. In some examples, Step 406 may use the indication of the at least one aspect of the visual brand language received by Step 402 to identify the visual element corresponding to the particular brand and the visual element unrelated to the particular brand in the original visual content. In some examples, the visual element corresponding to the particular brand may include at least one of a logo corresponding to the particular brand, a product corresponding to the particular brand and an element in a color corresponding to the particular brand.

In some examples, the indication of the at least one aspect of the visual brand language received by Step 402 may include an indication of a family of shapes. The new visual content generated by Step 406 may include a depiction of an object with a shape corresponding to the family of shapes. In one example, the indication of the desired visual content received by Step 404 may include an indication of an original visual content, and the generation of the new visual content consistent with the visual brand language and corresponding to the desired visual content by Step 406 may include a modification of a shape in the original visual content to a shape corresponding to the family of shapes. In another example, the indication of the desired visual content received by Step 404 may include an indication of an original visual content, and the generation of the new visual content consistent with the visual brand language and corresponding to the desired visual content by Step 406 may include an insertion of the object with the shape corresponding to the family of shapes to the original visual content, for example using a visual mating algorithm.

In some examples, the indication of the at least one aspect of the visual brand language received by Step 402 may include an indication of a color scheme. The new visual content generated by Step 406 may include a depiction corresponding to the color scheme. In one example, the indication of the desired visual content received by Step 404 may include an indication of an original visual content, and the generation of the new visual content consistent with the visual brand language and corresponding to the desired visual content by Step 406 may include a modification of colors in the original visual content to colors corresponding to the family of shapes. In one example, the indication of the desired visual content received by Step 404 may include an indication of an original visual content, and the generation of the new visual content consistent with the visual brand language and corresponding to the desired visual content by Step 406 may include an insertion of an object with colors corresponding to the color scheme to the original visual content, for example using a visual mating algorithm.

In some examples, the indication of the at least one aspect of the visual brand language received by Step 402 may include an indication of typographical preference. The new visual content generated by Step 406 may include a depiction of text corresponding to the typographical preference. For example, the indication of the typographical preference may include an indication of a particular font, and the depiction of text may be a depiction of text in the particular font. In another example, the indication of the typographical preference may include an indication of a letter-spacing, and the depiction of text may be a depiction of text corresponding to the letter-spacing. In yet another example, the indication of the typographical preference may include an indication of a font size, and the depiction of text may be a depiction of text corresponding to the font size. In an additional example, the indication of the typographical preference may include an indication of a font styling, and the depiction of text may be a depiction of text corresponding to the font styling. In one example, the indication of the desired visual content received by Step 404 may include an indication of an original visual content, and the generation of the new visual content consistent with the visual brand language and corresponding to the desired visual content by Step 406 may include a modification of a first depiction of text in the original visual content to a depiction of text corresponding to the typographical preference. In one example, the indication of the desired visual content received by Step 404 may include an indication of an original visual content, and the generation of the new visual content consistent with the visual brand language and corresponding to the desired visual content by Step 406 may include an insertion of a depiction of text corresponding to the typographical preference to the original visual content, for example using a visual mating algorithm.

In some examples, an original visual content may be transmitted over a communication line (such as communication line 132) from a server (such as server 120) to an end device (such as end device 110), and the indication of the desired visual content received by Step 404 may be determined based on the original visual content by a third computing device (such as computing device 140) different from the server and the end device accessing the communication line. For example, the third computing device may sniff the communication going through the communication line to obtain the original visual content. In another example, the server may be configured to transmit the original visual content to the third computing device, and the third computing device may be configured to transmit the original visual content to the end device. In one example, in response to a first original visual content, the third computing device may determine a first indication of the desired visual content, and in response to a second original visual content, the third computing device may determine a second indication of the desired visual content, the second indication may differ from the first indication. In some examples, in Step 408, providing the new visual content in the format ready for presentation may include transmitting the new visual content in the format ready for presentation from the third device (for example, from computing device 140) to the end device (for example, to end device 110).

In some examples, method 400 may further comprise receiving an indication of a characteristic of a user. For example, receiving the indication of the characteristic of the user may comprise at least one of reading the indication from memory, receiving the indication from an external device, determining the indication by analyzing data (for example, by analyzing historic behavior data associated with the user, such as historic usage data, historic reactions, etc.), and so forth. In one example, Step 406 may further base the generation of the new visual content consistent with the visual brand language and corresponding to the desired visual content on the indication of the characteristic of the user. In one example, the characteristic of the user may be or include a demographic detail of the user. In one example, the characteristic of the user may be based on past behavior of the user. In one example, the indication of the characteristic of a user may be or include an indication that the user belongs to a particular group of users. In one example, Step 408 may provide new visual content in the format ready for presentation for a presentation of the new visual content to the user. In one example, in Step 408 providing the new visual content in the format ready for presentation may include transmitting the new visual content in the format ready for presentation to an end device configured to present the new visual content.

FIG. 4B is a flowchart of an exemplary method 420 for generating visual content consistent with aspects of a visual brand language. In this example, method 420 may comprise analyzing an original visual content indicated by the indication of the desired visual content using the indication of the at least one aspect of the visual brand language to determine at least one brand related visual aspect of the original visual content and a plurality of brand independent visual aspects of the original visual content (Step 422); receiving an indication of a particular visual aspect of the original visual content of the plurality of brand independent visual aspects for modification (Step 424); and analyzing the original visual content to generate the new visual content consistent with the visual brand language and corresponding to the desired visual content, the new visual content may be substantially identical to the original visual content with respect to the at least one brand related visual aspect and may differ from the visual in the particular visual aspect of the original visual content (Step 426).

In some examples, the original visual content may be analyzed to embed the original visual content in a mathematical space. The mathematical space may include at least one direction corresponding to the at least one brand related visual aspect of the original visual content determined by Step 422. Additionally or alternatively, the mathematical space may include at least one direction corresponding to the particular visual aspect of the original visual content for modification of Step 424. In some examples, the embedding of the original visual content in the mathematical space may be used to determine a new point in the mathematical space. For example, the new point may be a function of the embedding of the original visual content in the mathematical space (for example, a linear function, a non-linear function, a polynomial function, a transformation function, and so forth). The new point may be on a plain in the mathematical space that is substantially perpendicular to the at least one direction corresponding to the at least one brand related visual aspect of the visual (for example, perpendicular, up to 1 degrees of a perpendicular plain, up to 5 degrees of a perpendicular plain, up to 15 degrees of a perpendicular plain, and so forth). Additionally or alternatively, the distance between the embedding of the original visual content in the mathematical space and the plain may be less than a particular threshold (for example, the threshold may be selected based on a distance between two objects in the mathematical space, the distance may be zero, and so forth). In some examples, the new point in the mathematical space may be used to generate the new visual content consistent with the visual brand language and corresponding to the desired visual content. In one example, a transformation function may be used to analyze the original visual content and embed it in the mathematical space, and an inverse of the transformation function may be used to determine the new visual content from the new point in the mathematical space.

In some examples, the at least one brand related visual aspect of the original visual content determined by Step 422 may include at least one of a color scheme of at least a part of the original visual content, a logo depicted in the original visual content and a product depicted in the original visual content. In some examples, the plurality of brand independent visual aspects of the original visual content determined by Step 422 may include at least two of a gender of a person depicted in the original visual content, a race of the person depicted in the original visual content and an age of the person depicted in the original visual content. In some examples, the plurality of brand independent visual aspects of the original visual content determined by Step 422 may include at least two of a hairstyle of a person depicted in the visual, a visual aspect of an article of clothing of the person depicted in the original visual content and a visual aspect of an accessory used by the person depicted in the original visual content. In some examples, the plurality of brand independent visual aspects of the original visual content determined by Step 422 may include a landscape depicted in the original visual content. In some examples, the plurality of brand independent visual aspects of the original visual content determined by Step 422 may include at least two different visual aspects of an object depicted in the original visual content. For example, the plurality of brand independent visual aspects of the original visual content determined by Step 422 may include at least two of a size, a shape and a color of the object depicted in the original visual content.

In some examples, the indication of the desired visual content received by Step 404 may include an indication of an original visual content. In some examples, Step 422 may comprise analyzing the original visual content using the indication of the at least one aspect of the visual brand language received by Step 402 to determine at least one brand related visual aspect of the original visual content and/or a plurality of brand independent visual aspects of the original visual content.

In some examples, Step 424 may comprise receiving an indication of a particular visual aspect of the original visual content of the plurality of brand independent visual aspects determined by Step 422 for modification. For example, receiving the indication of the particular visual aspect of the original visual content may comprise at least one of reading the indication from memory, receiving the indication from an external device, receiving the indication from a user (for example through a user interface), automatically selecting the particular visual aspect based on one or more rules, automatically selecting the particular visual aspect based on the indication of the desired visual content received by Step 404, and so forth. In one example, the plurality of brand independent visual aspects determined by Step 422 may be presented to a user (for example, through a user interface, through an app, through a website, etc.), and the user may select the particular visual aspect of the original visual content for modification of the presented plurality of brand independent visual aspects (for example, through a user interface, through an app, through a website, etc.). In one example, Step 424 may comprise determining affinities between the indication of the desired visual content received by Step 404 and each one of the plurality of brand independent visual aspects determined by Step 422, for example using a distance function or a similarity function. Further, Step 424 may select the particular visual aspect of the original visual content of the plurality of brand independent visual aspects determined by Step 422 based on the corresponding affinities. For example, the particular visual aspect of the original visual content may correspond to the highest (or in another example lowest) affinity.

In some examples, Step 426 may comprise analyzing the original visual content to generate the new visual content consistent with the visual brand language and corresponding to the desired visual content. The new visual content may be substantially identical to the original visual content with respect to the at least one brand related visual aspect and may differ from the original visual content in the particular visual aspect of the original visual content.

Figure 5:
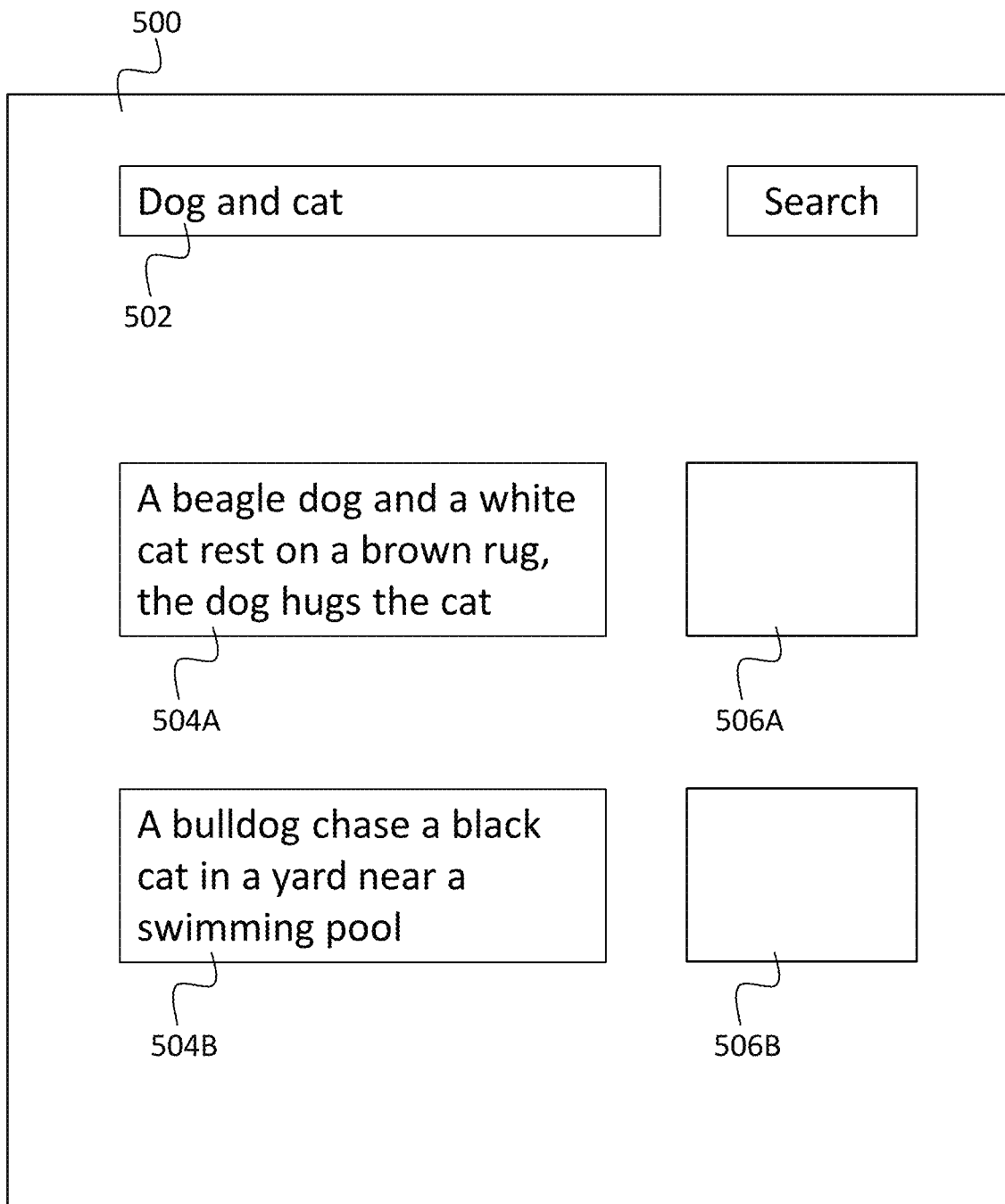
FIG. 5 is an illustration of exemplary user interface.

FIG. 5 is an illustration of exemplary user interface 500. In this example, user interface 500 may include input field 502 for a user to input keywords, a 'Search' button, text boxes 504 and corresponding views of visual contents 506. For example, in this example, user interface 500 may include text box 504A, visual content 506A corresponding to text box 504A, text box 504B, and visual content 506B corresponding to text box 504B. User interface 500 is an example, and other user interfaces may be used, including all, some or none of the elements of user interface 500, and in some examples including additional elements not included in user interface 500. In one example, the textual content of one or more of text boxes 504 may be automatically generated (for example using Step 604) based on the keywords a user entered in input field 502 (for example using Step 602), for example once the user enters the keywords or in response to a click on the 'Search' button. In another example, the user may enter the textual content of one or more of text boxes 504. In yet another example, the user may edit and/or modify the textual content of one or more of text boxes 504 (for example using Step 608). In some examples, the visual contents 506 may be automatically generated based on the textual content in the corresponding text boxes 504. For example, visual content 506A may be automatically generated based on the textual content in text box 504A, visual content 506B may be automatically generated based on the textual content in text box 504B. In one example, visual content 506 may automatically change in response to changes to the textual content in the corresponding text box 504. For example, visual content 506A may automatically change in response to changes to the textual content in text box 504A, visual content 506B may automatically change in response to changes to the textual content in text box 504B, and so forth. In some examples, user interface 500 may enable the user to select (for example, using Step 610) one textual content of the plurality of textual contents in text boxes 504. For example, user interface 500 may enable the user to select the one textual content by clicking or otherwise selecting the corresponding text box of the plurality of text boxes 504. In another example, user interface 500 may enable the user to select the one textual content by clicking or otherwise selecting the visual content 506 corresponding to the textual content.

Figure 6:
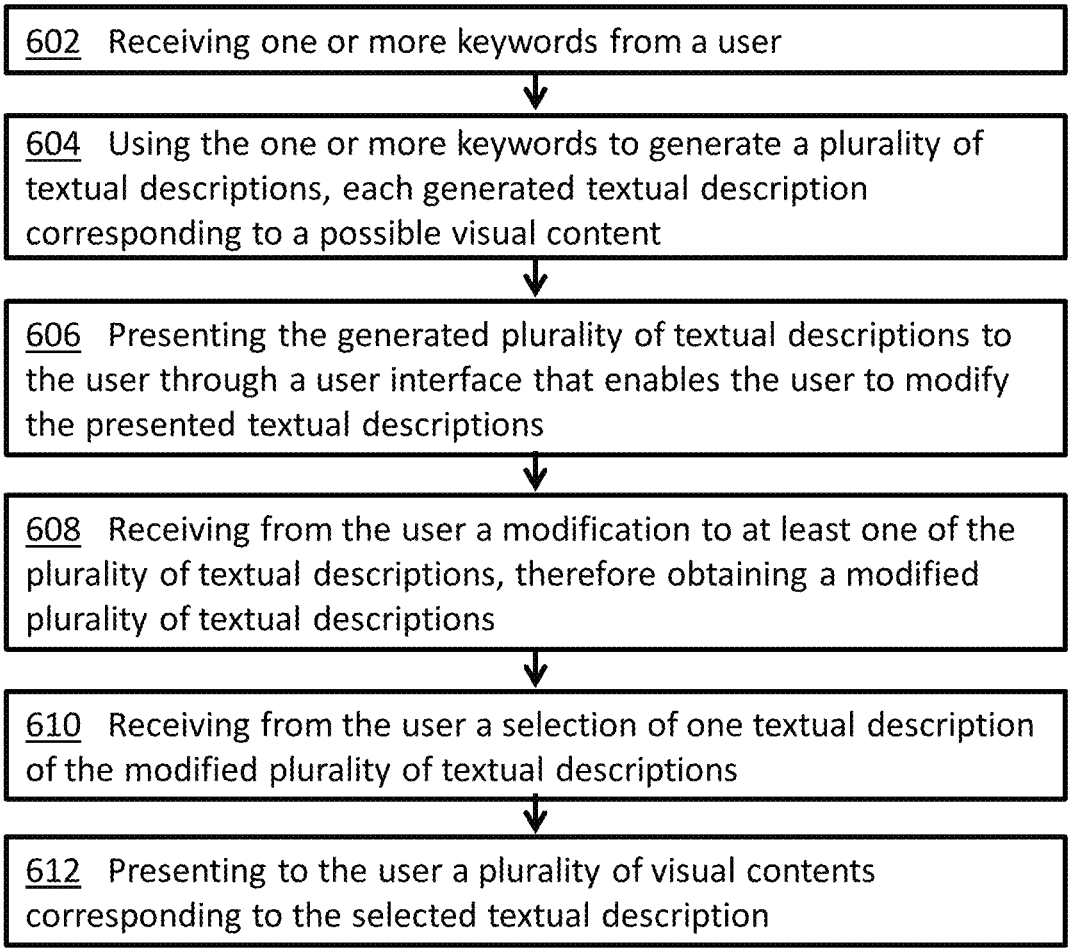
FIG. 6 is a flowchart of an exemplary method for generating and modifying synthetic visual content using textual input.

FIG. 6 is a flowchart of an exemplary method 600 for generating and modifying synthetic visual content using textual input. In this example, method 600 may comprise receiving one or more keywords from a user (Step 602); using the one or more keywords to generate a plurality of textual descriptions (Step 604), each generated textual description may correspond to a possible visual content; presenting the generated plurality of textual descriptions to the user through a user interface that enables the user to modify the presented textual descriptions (Step 606); receiving from the user a modification to at least one of the plurality of textual descriptions, therefore obtaining a modified plurality of textual descriptions (Step 608); receiving from the user a selection of one textual description of the modified plurality of textual descriptions (Step 610); and presenting to Presenting to the user a plurality of visual contents corresponding to the selected textual description (Step 612).

In some examples, Step 602 may comprise receiving one or more keywords from a user. For example, receiving the one or more keywords in Step 602 may comprise at least one of reading the one or more keywords from memory (for example from a data structure, a database or a file containing the one or more keywords received from the user), receiving the one or more keywords from an external device (for example from an external device using user interface 500), receiving the one or more keywords through a user interface (such as user interface 500), receiving the one or more keywords audibly (for example by analyzing audio including speech of the user using speech recognition algorithms), and so forth.

In some examples, Step 604 may comprise using the one or more keywords received by Step 602 to generate a plurality of textual descriptions. In some examples, each generated textual description may correspond to a possible visual content. For example, the one or more keywords received by Step 602 may be used as input to a generative model configured to generate textual descriptions from keywords. In another example, a search engine may be used to search documents using the one or more keywords received by Step 602, each document found by the search engine may be summarized using textual summary algorithm to generate one of the plurality of textual descriptions.

In one example, the one or more keywords received by Step 602 may include at least one object, and each textual description generated by Step 604 may include an indication of the at least one object (such as a mentioning of the at least one object, a description of the at least one object, and so forth). For example, the keywords may include 'car' and the textual description may include 'car on the road', the keywords may include 'dog' and the textual description may include 'man's best friend', and so forth. In one example, the one or more keywords received by Step 602 may include at least one action, and each textual description generated by Step 604 may include an indication of the at least one action (such as a mentioning of the at least one action, a description of the at least one action, an indication of a result of the at least one action, and so forth). For example, the keywords may include 'paying' and the textual description may include 'paying a cashier', the keywords may include 'running' and the textual description may include 'participating in a marathon', the keywords may include 'wining' and the textual description may include 'knocking her opponent', and so forth. In one example, the one or more keywords received by Step 602 may include at least one visual characteristic, and each textual description generated by Step 604 may include an indication of an object with the at least one visual characteristic (for example, a mentioning of the object and the at least one visual characteristic, a description of the object and the at least one visual characteristic, and so forth). For example, the keywords may include 'white' and the textual description may include 'a white cat', the keywords may include 'small' and the textual description may include 'a small key', the keywords may include 'furry' and the textual description may include 'a furry toy animal', and so forth.

In some examples, the generation of the plurality of textual descriptions by Step 604 may be based on the user. For example, based on a demographic detail of the user, based on past behavior of the user (such as past modification to textual descriptions by the user, past selection of textual descriptions by the user, etc.), and so forth. For example, in response to a first group of one or more keywords and a first user, Step 604 may generate a first plurality of textual descriptions, and in response to the first group of one or more keywords and a second user, Step 604 may generate a second plurality of textual descriptions, the second plurality may differ from the first plurality. For example, in response to a keyboard of 'teenager', for a user that showed affinity to contents (textual and/or visual) of social events, Step 604 may generate plurality of textual descriptions describing social events involving teenagers, while for a user that showed affinity to contents (textual and/or visual) related to workplaces, Step 604 may generate plurality of textual descriptions describing teenagers working and/or studying.

In some examples, Step 606 may comprise presenting the plurality of textual descriptions generated by Step 604 to the user of Step 602 through a user interface that enables the user to modify the presented textual descriptions. A non-limiting example of such user interface may include user interface 500. In one example, the user may delete one or more portions of any one of the textual descriptions, may add text to any one of the textual descriptions, may modify portions of any one of the textual descriptions, and so forth.

In some examples, Step 608 may comprise receiving from the user a modification to at least one of the plurality of textual descriptions (for example, through user interface 500, through voice commands identified in audio data using speech recognition algorithms, through gesture identified in image data using gesture recognition algorithms, and so forth), therefore obtaining a modified plurality of textual descriptions. For example, the received modification may be to one of the plurality of textual descriptions, to at least two of the plurality of textual descriptions, to at least half of the plurality of textual descriptions, to all textual descriptions of the plurality of textual descriptions, and so forth. In one example, the received modification to a particular textual description may include deletion of one or more portions of the particular textual description, an addition of text to the particular textual description, a replacement of one or more portions of the particular textual description, and so forth.

In some examples, in Step 606 presenting the generated plurality of textual descriptions to the user may include a presentation in conjunction with each textual description of a sample visual content corresponding to the textual description. In one example, for example in response to the modification to a particular textual description received by Step 608, method 600 may further comprise causing a modification to the presented sample visual content corresponding to the particular textual description, the modification to the presented sample visual content corresponds to the received modification to the particular textual description. In some examples, after the modification to the presented sample visual content, method 600 may repeat Step 608 to receive further modifications to one or more of the plurality of textual descriptions.

In some examples, Step 610 may comprise receiving from the user a selection of one textual description of the modified plurality of textual descriptions, for example through user interface 500, through voice commands identified in audio data using speech recognition algorithms, through gesture identified in image data using gesture recognition algorithms, and so forth. In one example, the select one textual description of the modified plurality of textual descriptions may be a textual description modified by the user in Step 608. In another example, the select one textual description of the modified plurality of textual descriptions may be a textual description generated by Step 604 and not modified by the user at any stage.

In some examples, Step 612 may comprise presenting to the user a plurality of visual contents corresponding to the selected textual description. For example, the presented plurality of visual contents may include at least one of an image, a video, an animation and an illustration. In another example, the presented plurality of visual contents may include at least one of a 3D image, a 3D video, a 3D animation and a 3D illustration. In some examples, at least one of the plurality of visual contents corresponding to the selected textual description may be selected from a plurality of alternative visual contents based on the selected textual description. For example, an affinity of the selected textual description to each visual content of the plurality of alternative visual contents may be calculated, for example using a similarity of a distance function, and the at least one of the plurality of visual contents may be selected based on the calculated affinities, for example by selecting the visual contents corresponding to the highest affinities. In some examples, at least one of the plurality of visual contents corresponding to the selected textual description using a generative adversarial network, for example using selected textual description as an input to the generative adversarial network. In some examples, at least one of the plurality of visual contents corresponding to the selected textual description using a conditional generative adversarial network with an input condition selected based on the selected textual description, for example with an input calculated by a function of the selected textual description.

In some examples, the selected textual description may be used to select a visual content of a plurality of alternative visual contents (for example as described above). Further, a convolution of at least part of the selected visual content may be calculated. In one example, in response to a first value of the calculated convolution, a first visual content may be included in the plurality of visual contents corresponding to the selected textual description presented by Step 612, and in response to a second value of the calculated convolution, including the first visual content in the plurality of visual contents corresponding to the selected textual description presented by Step 612 may be forgone. In one example, the first visual content based on the value of the calculated convolution, for example using a conditional generative adversarial network with the value of the calculated convolution as an input condition.

In some examples, method 600 may further comprise generating at least one of the plurality of visual contents corresponding to the selected textual description presented by Step 612 based on the user. For example, based on a demographic detail of the user, based on past behavior of the user (such as past modification to textual descriptions by the user, past selection of textual descriptions by the user, etc.), and so forth. For example, in response to a first selected textual description and a first user, method 600 may generate a first visual content, and in response to the first selected textual description and a second user, method 600 may generate a second visual content, the second visual content may differ from the first visual content. For example, in response to a selected textual description of 'two people looking at each other', for a user that showed affinity to romantic contents (textual and/or visual), method 600 may generate a visual content of two lovers looking at each other eyes, while for a user that showed affinity to confrontational contents (textual and/or visual), method 600 may generate a visual content of two rivals looking at each other before engaging in battle.

In some examples, method 600 may further comprise receiving information related to a brand. For example, receiving the information related to the brand may comprise at least one of reading the information related to the brand from memory, receiving the information related to the brand from an external device, determining the information related to the brand by analyzing data (for example using Step 402), and so forth. Further, Step 604 may base the generation of the plurality of textual descriptions on the information related to the brand. For example, the information related to the brand may include an indication of at least one aspect of a visual brand language associated with the brand, and method 600 may use Step 402 to receive an indication of the at least one aspect of a visual brand language associated with the brand. In another example, the information related to the brand may include keywords associated with the brand (such as brand keywords of the brand), and Step 604 may add the keywords associated with the brand to the keywords received by Step 602 to obtain an extended group of keywords, and may further use the extended group of one or more keywords to generate the plurality of textual descriptions, for example as described above. In yet another example, in response to a first group of one or more keywords and first information related to the brand, Step 604 may generate a first plurality of textual descriptions, and in response to the first group of one or more keywords and second information related to the brand, Step 604 may generate a second plurality of textual descriptions, the second plurality may differ from the first plurality.

In some examples, method 600 may further comprise receiving information related to a brand, for example as described above. Further, each one of the plurality of visual contents corresponding to the selected textual description presented by Step 612 may include at least one object corresponding to the brand. For example, the received information related to the brand may be an indication of at least one aspect of a visual brand language, and Step 612 may use Step 406 to generate at least one of the plurality of visual contents, with the textual description selected at Step 610 used as the indication of the desired visual content. In one example, a shape of the at least one object corresponding to the brand may be a shape corresponding to the brand. In one example, the at least one object corresponding to the brand may include a logo corresponding to the brand. In yet another example, the at least one object corresponding to the brand may include a product corresponding to the brand.

In some examples, method 600 may further comprise receiving information related to a brand, for example as described above. Further, each one of the plurality of visual contents corresponding to the selected textual description presented by Step 612 may include at least one segment with a color scheme corresponding to the brand. In some examples, method 600 may further comprise receiving information related to a brand, for example as described above. Further, each one of the plurality of visual contents corresponding to the selected textual description presented by Step 612 may include at least one depiction of text presented with typographical characteristics corresponding to the brand.

Continuously replaying a non-looped video clip, where the first and last frames of the clip are substantially visually different, create a non-natural visual experience that extracts viewers from the visual experience. It is therefore desired to generate and use looped video clips, where the first and last frames of the clip are identical or substantially visually similar. Manual generation of looped video clips requires much more effort and time than the generation of non-looped video clips. Moreover, with the increase used in automation of generation of video clips from still images, it is especially important to enable the automatically generated video clips to be looped visual clips, or the automated generation will not be useful when looped video clips are desired.

Figure 7A:
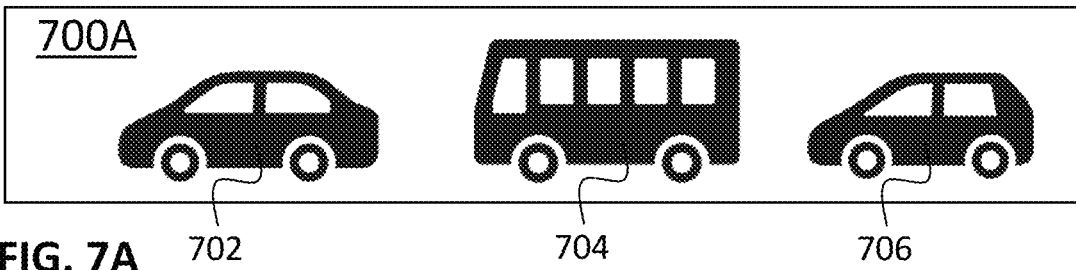
FIGS. 7A, 7B, 7C and 7D are illustrations of exemplary visual contents.
Figure 7B:
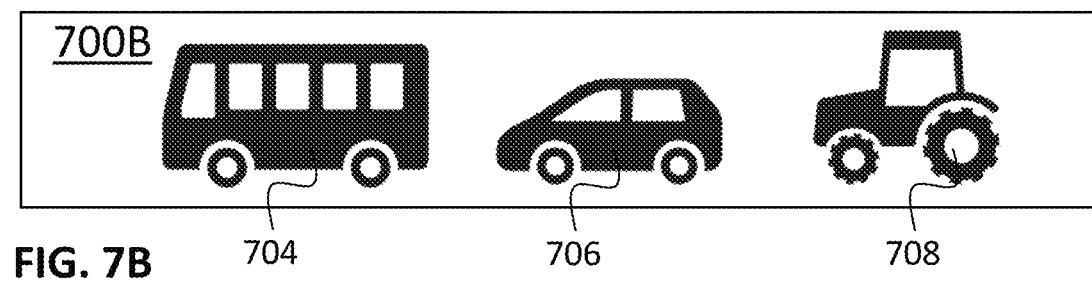
Figure 7C:
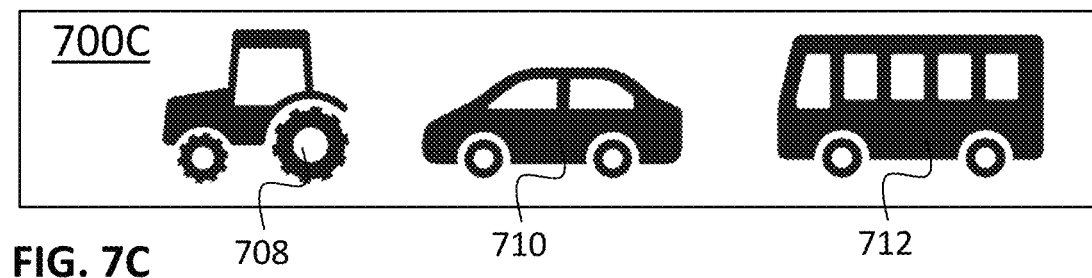
Figure 7D:
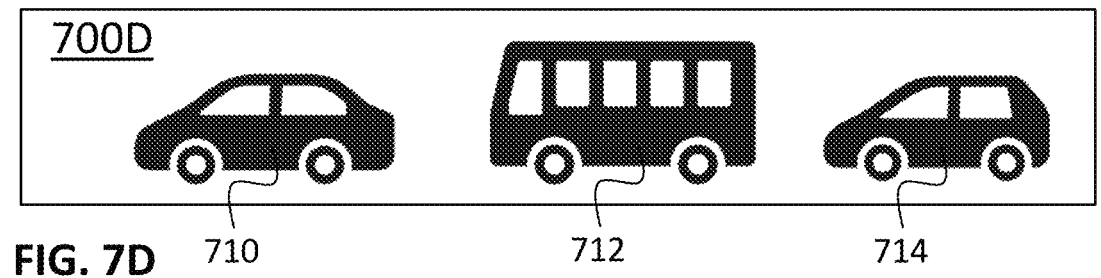

FIGS. 7A, 7B, 7C and 7D are illustrations of exemplary visual contents. FIG. 7A is illustration 700A of vehicle 702 followed by vehicle 704, which is followed by vehicle 706. FIG. 7B is illustration 700B of vehicle 704 followed by vehicle 706, which is followed by vehicle 708. FIG. 7C is illustration 700C of vehicle 708 followed by vehicle 710, which is followed by vehicle 712. FIG. 7D is illustration 700D of vehicle 710 followed by vehicle 712, which is followed by vehicle 714. Vehicle 702 in illustration 700A is visually identical or substantially visually similar to vehicle 710 in illustration 700D, and the position of vehicle 702 in illustration 700A is identical or substantially similar to the positon of vehicle 710 in illustration 700D. Vehicle 704 in illustration 700A is visually identical or substantially visually similar to vehicle 712 in illustration 700D, and the position of vehicle 704 in illustration 700A is identical or substantially similar to the positon of vehicle 712 in illustration 700D. Vehicle 706 in illustration 700A is visually identical or substantially visually similar to vehicle 714 in illustration 700D, and the position of vehicle 706 in illustration 700A is identical or substantially similar to the positon of vehicle 714 in illustration 700D.

FIG. 8A is a flowchart of exemplary method 800 for generating looped video clips. In this example, method 800 may comprise: receiving a still image (Step 802), analyzing the still image to generate a series of images (Step 804), the series of images may include at least a first image, a middle image and a last image, the first image may be substantially visually similar to the last image, and the middle image may be visually different from the first image and the last image; and providing the series of images in a format that enables playing the series of images in a video clip that starts with the first image and finishes with the last image (Step 806), wherein repeating the video clip from the first image immediately after completing the playing of the video clip with a presentation of the last image creates visually smooth transaction in which the transition from the last image to the first image is visually indistinguishable from the transactions between frames within the video clip. In some examples, illustrations 700A, 700B, 700C and 700D may be part of the series of images generated by method 800.

In some examples, Step 802 may comprise receiving a still image. In one example, receiving the still image may comprise at least one of reading the still image from memory, receiving the still image from an external device, capturing the still image using an image sensor, generating the still image (for example by analyzing another visual content, for example using method 400, using method 600, using method 900, using method 1000, etc.), and so forth. In one example, the still image may be a frame of a source video clip.

In some example, Step 804 may comprise analyzing the still image received by Step 802 to generate a series of images. The series of images may include at least a first image, a middle image and a last image. The first image may be identical or substantially visually similar to the last image, and the middle image may be substantially visually different from the first image and from the last image. In one example, the first image may be different but substantially visually similar to the last image. In one example, at least one of the series of images may be identical or substantially visually similar to the still image. In one example, at least one object appearing in the middle image does not appear in any one of the first image and the last image. In one example, at least one object appearing in both the first image and the last image does not appear in the middle image. In one example, a location of a particular object in the middle image may be substantially different from a location of the particular object in the first image and from a location of the particular object in the last image, while in one example the location of the particular object in the first image may be identical or nearby the location of the particular object in the last image. In one example, an orientation of a particular object in the middle image may be substantially different from an orientation of the particular object in the first image and from an orientation of the particular object in the last image, while in one example the orientation of the particular object in the first image may be identical or nearby the orientation of the particular object in the last image.

In one example, Step 804 may use method 820 to analyze the still image received by Step 802 and generate the series of images. In some examples, Step 804 may use a series of visual modifications. Each visual modification in the series of visual modifications may have a corresponding inverse visual modification. Applying the inverse visual modification of any particular visual modification to a visual content that is a result of applying the particular visual modification to a particular visual content may result is a visual content that is identical or substantially visually similar to the particular visual content. For example, a visual modification may include removing a particular object from a visual content, and the inverse visual modification may including inserting the particular object to the visual content at the same location and orientation or substantially the same location and orientation in the visual content. In another example, a visual modification may include moving a particular object from a first location to a second location in a visual content, and the inverse visual modification may including moving the particular object from the second location to the first location or nearby the first place in the visual content. In one example, Step 804 may repeatedly apply the visual modifications to the still image received by Step 802 in the order of the series of visual modifications, and then apply the inverse visual modifications in a backward order of the series of visual modifications, to generate the series of image.

In some examples, Step 806 may comprise providing the series of images in a format that enables playing the series of images in a video clip that starts with the first image and finishes with the last image. In one example, repeating the video clip from the first image immediately after completing the playing of the video clip with a presentation of the last image may create visually smooth transaction in which the transition from the last image to the first image is visually indistinguishable from the transactions between frames within the video clip. For example, providing the series of images in the format that enables playing the series of images in a video clip that starts with the first image and finishes with the last image may include at least one of storing the series of images in the format that enables playing the series of images in a video clip that starts with the first image and finishes with the last image in memory, transmitting the series of images in the format that enables playing the series of images in a video clip that starts with the first image and finishes with the last image to an external device, and so forth. A format that enables playing the series of images in a video clip that starts with the first image and finishes with the last image may include a format that other processes and/or other devices may use to present the series of images in a video clip that starts with the first image and finishes with the last image. Some non-limiting examples of such format that enables playing the series of images in a video clip that starts with the first image and finishes with the last image may include image file formats, video file formats, standard formats, proprietary formats, non-compressed formats, compressed formats, lossless compressed formats, lossy compressed formats, vector formats, 2 dimensional formats, 3 dimensional formats, and so forth. In one non-limiting example, providing the series of images in the format that enables playing the series of images in a video clip that starts with the first image and finishes with the last image may include providing the series of images to a display controller, for example by storing it in a memory shared with the display controller or by transmitting it to the display controller (for example, over a bus), in a format that the display controller is configured to receive for presentation of visual content. Further, the display controller may cause the presentation of the series of images, for example in response to and/or using the provided information.

In some examples, the still image received by Step 802 may include a depiction of a cloud, and the series of images generated by Step 804 may include different depictions of the cloud (for example, with different shapes, at different positions, and so forth). In some examples, the series of images generated by Step 804 may include depictions of a first cloud and a second cloud, and the depiction of the first cloud in the first image may be identical or substantially visually similar to the depiction of the second cloud in the last image. In one example, the second cloud is not visible in the first image, the first cloud is not visible in the last image, and both the first cloud and the second cloud may be visible in the middle image.

In some examples, the still image received by Step 802 may include a depiction of a bird, the series of images generated by Step 804 may include different depictions of the bird (for example, with wings at different poses, at different positions, and so forth). In some examples, the series of images generated by Step 804 may include depictions of a first bird and a second bird, and the depiction of the first bird in the first image may be identical or substantially visually similar to the depiction of the second bird in the last image. In one example, the second bird is not visible in the first image, the first bird is not visible in the last image, and both the first bird and the second bird may be visible in the middle image.

In some examples, the still image received by Step 802 may include a depiction of a vehicle, the series of images generated by Step 804 may include different depictions of the vehicle (for example, depiction of the vehicles from different angles, depictions of the vehicle at different positions, and so forth). In some examples, the series of images generated by Step 804 may include depictions of a first vehicle and a second vehicle, and the depiction of the first vehicle in the first image may be identical or substantially visually similar to the depiction of the second vehicle in the last image. In one example, the second vehicle is not visible in the first image, the first vehicle is not visible in the last image, and both the first vehicle and the second vehicle may be visible in the middle image.

FIG. 8B is a flowchart of exemplary method 820 for generating looped video clips. In this example, method 820 may comprise: determining a mathematical object corresponding to the still image in a mathematical space (Step 822), the mathematical space may include at least a plurality of mathematical objects, each mathematical object of the plurality of mathematical objects may correspond to an image, the mathematical object corresponding to the still image may be included in the plurality of mathematical objects; using the mathematical space and the mathematical object corresponding to the still image to obtain two or more mathematical objects of the plurality of mathematical objects (Step 824); and using the obtained two or more mathematical objects to generate the series of images (Step 826). In some examples, the mathematical space may be a vector space, and the mathematical objects may be mathematical vectors. In one example, the plurality of mathematical objects may include all objects in the mathematical space. In another example, at least one mathematical object of the mathematical space is not included in the plurality of mathematical objects. In some examples, the plurality of mathematical objects may form a mathematical sub-space in the mathematical space. In some examples, the plurality of mathematical objects may form a manifold in the mathematical space. In some examples, the mathematical space may be a non-orientable space. Some non-limiting examples of such non-orientable space may include Mobius strips, Roman surfaces, real projective planes, and Klein bottles.

In some examples, Step 822 may comprise determining a mathematical object corresponding to the still image received by Step 802 in a mathematical space. The mathematical space may include at least a plurality of mathematical objects. Each mathematical object of the plurality of mathematical objects may correspond to an image. The mathematical object corresponding to the still image may be included in the plurality of mathematical objects. In one example, Step 822 may analyze the still image to determine the mathematical object corresponding to the still image received by Step 802 in the mathematical space. For example, a convolution of at least part of the still image may be calculated, and Step 822 may base the determination of the mathematical object based on a value of the convolution of the at least part of the still image. In one example, in response to a first value of the convolution of the at least part of the still image, Step 822 may determine that a first mathematical object corresponds to the still image, and in response to a second value of the convolution of the at least part of the still image, Step 822 may determine that a second mathematical object corresponds to the still image, the second mathematical object may differ from the first mathematical object. In another example, the mathematical object corresponding to the still image may include a plurality of components, and at least one particular component may be a function of the value of the convolution of the at least part of the still image. In one example, Step 822 may use a machine learning model trained using training examples to determine mathematical objects correspond to still images. An example of such training example may include a sample still image, together with a label indicative of the desired determination of mathematical object corresponding to the sample still image. For example, Step 822 may use the trained machine learning model to analyze the still image received by Step 802 and determine the mathematical object corresponding to the still image.

In some examples, Step 822 may further comprise generating the mathematical space. For example, Step 822 may analyze the still image received by Step 802 to generate the mathematical space. In one example, in response to a first still image, Step 822 may generate a first mathematical space, and in response to a second still image, Step 822 may generate a second mathematical space. The second mathematical space may differ from the first mathematical space. In another example, the still image may be categorized to one of a plurality of alternative categories, for example using image classification algorithm, and Step 822 may select the mathematical space of a plurality of alternative mathematical spaces based on the category of the still image. For example, the still image may be categorized as indoor or outdoor, in response to the still image being categorized as indoor, Step 822 may select a mathematical space corresponding to indoor images, and in response to the still image being categorized as outdoor, Step 822 may select a mathematical space corresponding to outdoor images. In another example, the still image may be categorized by types of objects depicted in the still image, and the mathematical space may be generated based on the category.

In some examples, Step 824 may comprise using the mathematical space and the mathematical object corresponding to the still image to obtain two or more mathematical objects of the plurality of mathematical objects. In one example, Step 824 may use a random walk in the mathematical space starting at the mathematical object corresponding to the still image as a starting point to select the two or more mathematical objects. In another example, Step 824 may use the nearest neighbors to the mathematical object corresponding to the still image of the plurality of mathematical objects as the two or more mathematical objects (for example, the two nearest neighbors, the three nearest neighbors, a number between four and ten of the nearest neighbors, a number larger than ten of the nearest neighbors, etc.).

In some examples, Step 824 may use the mathematical object corresponding to the still image to obtain a mathematical curve in the mathematical space, and may use the mathematical curve to obtain the two or more mathematical objects of the plurality of mathematical objects. For example, the obtained two or more mathematical objects may be points on the mathematical curve. In one example, Step 824 may use the mathematical object as a parameter to a parametric function, and the parametric function may define the mathematical curve. In one example, Step 824 may use the mathematical object as a parameter in an underdetermined equation, to reduce the number of solutions of the equations to a single mathematical curve, and to thereby generate the mathematical curve. In one example, the mathematical curve may be a closed curve. In one example, the mathematical object corresponding to the still image may be at a center of the mathematical curve. For example, Step 824 may use the mathematical object corresponding to the still image as a center, and use a circle with a selected radius around the mathematical object as the mathematical curve. In one example, the mathematical object corresponding to the still image may be on the mathematical curve. For example, Step 824 may use the mathematical object corresponding to the still image as a starting point, and generate the mathematical curve by performing predetermined steps from the starting point. In some examples, Step 824 may use the mathematical curve to obtain the two or more mathematical objects of the plurality of mathematical objects. For example, the two or more mathematical objects may be selected at random from mathematical objects included in mathematical curve. In another example, mathematical objects at equal distances on the mathematical curve may be selected as the two or more mathematical objects may be selected. In yet another example, intersections of the mathematical curve with other mathematical groups (such as other curves, planes, gridlines, etc.) in the mathematical space may be used as the two or more mathematical objects may be selected.

In some examples, Step 826 may comprise using the two or more mathematical objects obtained by Step 824 to generate the series of images. In some examples, each image of the series of images may correspond to one of the two or more mathematical objects. For example, Step 826 may collect all the images corresponding to the two or more mathematical objects to generate the series of images. Further, the two or more mathematical objects may have an inherent order, and the order of the images in the series of images may be based on the order of the corresponding mathematical objects. For example, the two or more mathematical objects may be points on a mathematical curve, as described above, and an order of images in the series of images may correspond to an order of the points on the mathematical curve. In another example, the two or more mathematical objects may be ordered based on their distance from the mathematical object corresponding to the still image received by Step 802, and an order of images in the series of images may correspond to the order of the two or more mathematical objects. In one example, the distance in the mathematical space between any two mathematical objects corresponding to adjunct images of the series of images may be below a particular threshold, the distance in the mathematical space between the two mathematical objects corresponding to the first image and the last image may be below the particular threshold, and the distance in the mathematical space between the two mathematical objects corresponding to the first image and the middle image may be above the particular threshold (above twice the particular threshold, etc.).

A/B testing (also known as bucket test or split-run testing) is an important tool used to improve user experience and increase desired user engagement and activity. When visual contents are generated or selected manually, it is straightforward to test the impact of a visual content using A/B testing. However, when visual contents are generated automatically, possibly personalized to a particular user and generated on the fly, an integration of the testing results into the generation process is desired.

FIG. 9 is a flowchart of an exemplary method 900 for optimizing visual contents. In this example, method 900 may comprise: accessing a particular visual content (Step 902); determining a particular mathematical object corresponding to the particular visual content in a mathematical space (Step 904), the mathematical space may include at least a plurality of mathematical objects, each mathematical object of the plurality of mathematical objects may correspond to a visual content; using the mathematical space and the particular mathematical object corresponding to the particular visual content to obtain at least a first mathematical object and a second mathematical object of the plurality of mathematical objects (Step 906); using the visual content corresponding to the first mathematical object in a communication with a first user and the visual content corresponding to the second mathematical object in a communication with a second user (Step 908); receiving an indication of a reaction of the first user to the communication with the first user and an indication of a reaction of the second user to the communication with the second user (Step 910); obtaining a third visual content based on the reaction of the first user and the reaction of the second user (Step 912); and using the third visual content in a communication with a third user (Step 914). In one example, the mathematical space may be a vector space, and the mathematical objects may be mathematical vectors. In one example, the plurality of mathematical objects may include all objects in the mathematical space. In one example, at least one mathematical object of the mathematical space is not included in the plurality of mathematical objects. In one example, the plurality of mathematical objects may form a mathematical sub-space in the mathematical space. In one example, the plurality of mathematical objects may form a manifold in the mathematical space. In one example, the mathematical space may be a non-orientable space. Some non-limiting examples of such non-orientable space may include Mobius strips, the Roman surfaces, real projective planes, and Klein bottles. In one example, a dimension of the mathematical space may be at least two, may be between three and ten, may be more than ten, may be less than one thousand, may be less than one hundred, may be less than ten, may be less than the number of pixels in the visual content access by Step 902, may be less than half of the number of pixels, may be less than one tenth of the number of pixels, may be less than one percent of the number of pixels, may be equal to the number of pixels, may be more than the number of pixels, and so forth.

In some examples, Step 902 may comprise accessing a particular visual content. In one example, accessing the particular visual content may comprise at least one of reading the particular visual content from memory, receiving the particular visual content from an external device, capturing the particular visual content using an image sensor, generating the particular visual content (for example by analyzing another visual content, for example using method 400, using method 600, using method 900, using method 1000, etc.), and so forth. Some non-limiting examples of such visual content may include an image, a 2-dimensional image, a 3-dimensional image, a video clip, a 2-dimensional video clip, a 3-dimensional video clip, an animation, a 3-dimensional animation, a 2-dimensional animation, an illustration, a 2-dimensional illustration, a 3-dimensional illustration, and so forth.

In some examples, Step 904 may comprise determining a particular mathematical object corresponding to the particular visual content accessed by Step 902 in a mathematical space. The mathematical space may include at least a plurality of mathematical objects. Each mathematical object of the plurality of mathematical objects may correspond to a visual content. In one example, the particular visual content accessed by Step 902 may be or include a still image, and Step 904 may use Step 822 to determine the particular mathematical object corresponding to the visual content by determining the mathematical object corresponding to the still image. The particular mathematical object corresponding to the particular visual content may be included in the plurality of mathematical objects. In one example, Step 904 may analyze the particular visual content accessed by Step 902 to determine the particular mathematical object corresponding to the particular visual content in the mathematical space. For example, a convolution of at least part of the particular visual content may be calculated, and Step 904 may base the determination of the particular mathematical object based on a value of the convolution of the at least part of the particular visual content. In one example, in response to a first value of the convolution of the at least part of the particular visual content, Step 904 may determine that a first mathematical object corresponds to the particular visual content, and in response to a second value of the convolution of the at least part of the particular visual content, Step 904 may determine that a second mathematical object corresponds to the particular visual content, the second mathematical object may differ from the first mathematical object. In another example, the particular mathematical object corresponding to the particular visual content may include a plurality of components, and at least one particular component may be a function of the value of the convolution of the at least part of the particular visual content. In one example, Step 904 may use a machine learning model trained using training examples to determine mathematical objects correspond to particular visual content s. An example of such training example may include a sample particular visual content, together with a label indicative of the desired determination of mathematical object corresponding to the sample particular visual content. For example, Step 904 may use the trained machine learning model to analyze the particular visual content received by Step 902 and determine the particular mathematical object corresponding to the particular visual content.

In some examples, Step 904 may further comprise generating the mathematical space. For example, Step 904 may analyze the particular visual content received by Step 902 to generate the mathematical space. In one example, in response to a first particular visual content, Step 904 may generate a first mathematical space, and in response to a second particular visual content, Step 904 may generate a second mathematical space. The second mathematical space may differ from the first mathematical space. In another example, the particular visual content may be categorized to one of a plurality of alternative categories, for example using image classification algorithm, and Step 904 may select the mathematical space of a plurality of alternative mathematical spaces based on the category of the particular visual content. For example, the particular visual content may be categorized as indoor or outdoor, in response to the particular visual content being categorized as indoor, Step 904 may select a mathematical space corresponding to indoor images, and in response to the particular visual content being categorized as outdoor, and Step 904 may select a mathematical space corresponding to outdoor images. In another example, the particular visual content may be categorized by types of objects depicted in the particular visual content, and the mathematical space may be generated based on the category.

In some examples, Step 906 may comprise using the mathematical space of Step 904 and the particular mathematical object corresponding to the particular visual content determined by Step 904 to obtain at least a first mathematical object and a second mathematical object of the plurality of mathematical objects. In one example, Step 906 may select the first mathematical object and the second mathematical object randomly of the mathematical objects of the plurality of mathematical objects that are within a selected distance from the particular mathematical object corresponding to the particular visual content determined by Step 904 in the mathematical space of Step 904. In another example, Step 906 may select the first mathematical object and the second mathematical object randomly of the plurality of mathematical objects based on a distribution, the distribution may be based on distances of the plurality of mathematical objects from the particular mathematical object corresponding to the particular visual content determined by Step 904 in the mathematical space of Step 904. In yet another example, Step 906 may calculate the first mathematical object using a function of the particular mathematical object corresponding to the particular visual content determined by Step 904 in the mathematical space of Step 904, and/or may calculate the second mathematical object using a function of the particular mathematical object corresponding to the particular visual content determined by Step 904 in the mathematical space of Step 904.

In some examples, a plain in the mathematical space of Step 904 created by the first mathematical object obtained by Step 906, the second mathematical object obtained by Step 906 and the particular mathematical object determined by Step 904 may be substantially perpendicular to a direction in the mathematical space corresponding to a brand. For example, Step 906 may determine the plain in the mathematical space by selecting the plain that includes the particular mathematical object determined by Step 904 and is perpendicular to the direction in the mathematical space corresponding to the brand. For example, a direction in the mathematical space corresponding to the brand may be a direction that moving a mathematical object along it causes changes to an aspect related to the brand in the visual content corresponding to the moving mathematical object, while moving the mathematical object in a direction perpendicular to it cause no changes to the aspect related to the brand in the visual content corresponding to the moving mathematical object.

In some examples, Step 908 may comprise using the visual content corresponding to the first mathematical object obtained by Step 906 in a communication with a first user and the visual content corresponding to the second mathematical object obtained by Step 906 in a communication with a second user. In some examples, Step 914 may comprise using the third visual content in a communication with a third user. One non-limiting example of such communication with a user may include interaction of the user with a user interface and/or a website and/or an app containing the relevant visual content. Another non-limiting example of such communication with a user may include sending an email containing the relevant visual content to the user. Many other examples of such communication with a user may be used by Step 908 and/or by Step 914.

In some examples, Step 910 may comprise receiving an indication of a reaction of the first user to the communication with the first user of Step 908 and an indication of a reaction of the second user to the communication with the second user of Step 908. In one example, the communication with each user may include interaction of the user with at least one of a user interface, a website and an app, and the indication of the reaction of the user received by Step 910 may be based on the actions performed by the user in the at least one of the user interface, the website and the app. In one example, the communication with each user may include sending an email containing the relevant visual content to the user, and the indication of the reaction of the user received by Step 910 may be based on at least one of whether the user responded to the email, a content of the response of the user to the email, timing of the response of the user to the email, whether the user taken an action suggested in the email (such as following a link included in the email), and the properties of the action taken by the user.

In some examples, Step 912 may comprise obtaining a third visual content based on the reaction of the first user (of the indication received by Step 910) and the reaction of the second user (of the indication received by Step 910). In some examples, Step 912 may select the third visual content from the visual content corresponding to the first mathematical object and the visual content corresponding to the second mathematical object based on the reaction of the first user and the reaction of the second user. For example, in response to a first combination of the reaction of the first user and the reaction of the second user, Step 912 may select the visual content corresponding to the first mathematical object as the third visual content, and in response to a second combination of the reaction of the first user and the reaction of the second user, Step 912 may select the visual content corresponding to the second mathematical object as the third visual content. In some examples, the third visual content may differ from the visual content corresponding to the first mathematical object and from the visual content corresponding to the second mathematical object. In some examples, the distance between the first mathematical object obtained by Step 906 and the second mathematical object obtained by Step 906 in the mathematical space is larger than both the distance between the particular mathematical object determined by Step 904 and the first mathematical object obtained by Step 906 in the mathematical space and the distance between the particular mathematical object determined by Step 904 and the second mathematical object obtained by Step 906 in the mathematical space. In some examples, the third visual content obtained by Step 912 may correspond to a third mathematical object in the mathematical space, and the distance between the third mathematical object and the particular mathematical object obtained by Step 904 in the mathematical space may be larger than at least one of the distance between the third mathematical object and the first mathematical object obtained by Step 906 in the mathematical space and the distance between the third mathematical object and the second mathematical object in the mathematical space obtained by Step 906.

In some examples, Step 912 may use the reaction of the first user (of the indication received by Step 910) and the reaction of the second user (of the indication received by Step 910) to determine a linear combination of the first mathematical object and the second mathematical object in the mathematical space, and the third visual content obtained by Step 912 may correspond to or be determined based on the linear combination of the first mathematical object and the second mathematical object. In some examples, Step 912 may use the reaction of the first user and the reaction of the second user to determine a non-linear combination of the first mathematical object and the second mathematical object in the mathematical space, and the third visual content may correspond to or be determined based on the non-linear combination of the first mathematical object and the second mathematical object. For example, the reaction of the first user may be associated with a first numerical number, a1, and the reaction of the second user may be associated with a second numerical number, a2, for example based on a numerical score associated with each reaction (such as scores given by the user, scores based on elapsed time, scores based on engagement time, scores based on engagement level, scores based on associated sales, etc.). In one example, a coefficient of the first mathematical object in the linear combination may be a function of a1 and a2 (such as a1, a1/(a1+a2), a1*a1/(a1*a1+a2*a2), a1*log(a1/a2), etc.), and a coefficient of the second mathematical object in the linear combination may be a function of a1 and a2 (such as a2, a2/(a1+a2), a2*a2/(a1*a1+a2*a2), a2*log(a2/a1), etc.). In another example, any coefficient of a non-linear combination of the first mathematical object and the second mathematical object in the mathematical space may be a function of a1 and a2 (such as a1, a1/(a1+a2), a1*a1/(a1*a1+a2*a2), a1*log(a1/a2), etc.).

In some examples, Step 912 may use the reaction of the first user (of the indication received by Step 910) and the reaction of the second user (of the indication received by Step 910) to determine a linear combination of the first mathematical object and the second mathematical object in the mathematical space, for example as described above. In one example, the linear combination of the first mathematical object and the second mathematical object is not included in the plurality of mathematical objects of Step 904, and Step 912 may determine a mathematical object of the plurality of mathematical objects nearest to the linear combination of the first mathematical object and the second mathematical object. Further, the third visual content obtained by Step 912 may correspond to the mathematical object of the plurality of mathematical objects nearest to the linear combination of the first mathematical object and the second mathematical object.

In some examples, Step 912 may use the reaction of the first user (of the indication received by Step 910) and the reaction of the second user (of the indication received by Step 910) to select one direction of a direction of the first mathematical object obtained by Step 906 with respect to the particular mathematical object determined by Step 904 in the mathematical space and a direction of the second mathematical object obtained by Step 906 with respect to the particular mathematical object determined by Step 904 in the mathematical space. The direction of the first mathematical object obtained by Step 906 with respect to the particular mathematical object determined by Step 904 in the mathematical space may differ from the direction of the second mathematical object obtained by Step 906 with respect to the particular mathematical object determined by Step 904 in the mathematical space. For example, in response to a first combination of the reaction of the first user and the reaction of the second user, Step 912 may select the direction of the first mathematical object obtained by Step 906 with respect to the particular mathematical object determined by Step 904, and in response to a second combination of the reaction of the first user and the reaction of the second user, Step 912 may select the direction of the second mathematical object obtained by Step 906 with respect to the particular mathematical object determined by Step 904. Further, Step 912 may use the selected direction to obtain the third visual content. In some examples, Step 912 may use the selected direction to determine a third mathematical object in the mathematical space, and may use the third mathematical object to obtain the third visual content. In one example, a direction of the third mathematical object with respect to the particular mathematical object in the mathematical space may be identical or substantially identical (for example, less than one degree different between the directions, less than five degrees, less than ten degrees, less than fifteen degrees, etc.) to the direction of the first mathematical object with respect to the particular mathematical object in the mathematical space, and the distance of the third mathematical object from the particular mathematical object in the mathematical space may be larger than (for example, larger by at least a predetermined distance, large by at least a predetermined factor, etc.) the distance of the first mathematical object from the particular mathematical object in the mathematical space. For example, the distance of the third mathematical object from the particular mathematical object in the mathematical space may be based on a predetermined function (such as a linear function, a non-linear function, etc.) of the distance of the first mathematical object from the particular mathematical object in the mathematical space. In one example, the direction of the first mathematical object with respect to the particular mathematical object in the mathematical space may correspond to a first visual property of the corresponding visual contents and the direction of the second mathematical object with respect to the particular mathematical object in the mathematical space may correspond to a second visual property of the corresponding visual contents (the second visual property may differ from the first visual property). For example, the first visual property may be size of at least one object (for example, a regression model may be used to determine the size of the at least one object in a selected visual content, and thereby a position of the mathematical object corresponding to the selected visual content along the direction corresponding to size of the at least one object in the mathematical space) and the second visual property may be brightness of the at least one object (for example, a regression model may be used to determine the brightness of the at least one object in a selected visual content, and thereby a position of the mathematical object corresponding to the selected visual content along the direction corresponding to brightness of the at least one object in the mathematical space). In another example, the first visual property may be age of at least one person (for example, a regression model may be used to determine the age of the at least one person in a selected visual content, and thereby a position of the mathematical object corresponding to the selected visual content along the direction corresponding to age of the at least one person in the mathematical space) and the second visual property may be ethnicity of the at least one person (for example, a classification model may be used to determine the ethnicity of the at least one person in a selected visual content, and thereby a position of the mathematical object corresponding to the selected visual content along the direction corresponding to ethnicity of the at least one person in the mathematical space). In yet another example, the first visual property may be quantity of at least one object (for example, a visual detector may be used to determine the quantity of the at least one object in a selected visual content, and thereby a position of the mathematical object corresponding to the selected visual content along the direction corresponding to quantity of the at least one object in the mathematical space) and the second visual property may be type of the at least one object (for example, a classification model may be used to determine the type of the at least one object in a selected visual content, and thereby a position of the mathematical object corresponding to the selected visual content along the direction corresponding to type of the at least one object in the mathematical space). These are only examples of possible visual properties, and other visual properties may be used.

In some examples, the particular visual content determined by Step 904 may be unrelated to a brand, and the visual content corresponding to the first mathematical object obtained by Step 906 and the visual content corresponding to the second mathematical object obtained by Step 906 may be related to the brand. In one example, the visual content corresponding to the first mathematical object may include a first product corresponding to the brand and the visual content corresponding to the second mathematical object may include a second product corresponding to the brand, the second product may differ from the first product. Further, in one example, the third visual content obtained by Step 912 may include a product corresponding to the brand. Step 912 may select the product in the third visual content based on reaction of the first user (of the indication received by Step 910) and the reaction of the second user (of the indication received by Step 910). In one example, the visual content corresponding to the first mathematical object may include a depiction of a first text in a typographical preference corresponding to the brand and the visual content corresponding to the second mathematical object may include a depiction of a second text in the typographical preference corresponding to the brand, the second text may differ from the first text. Further, in one example, the third visual content obtained by Step 912 may include a text in the typographical preference corresponding to the brand. Step 912 may select the text in the third visual content based on reaction of the first user (of the indication received by Step 910) and the reaction of the second user (of the indication received by Step 910).

Manually changing visual contents may be time consuming and erroneous. Moreover, due to limitations of the manual abilities, the amount and type of changes to visual contents that may be limited. For example, the visual contents may be limited to still images, while videos may be preferred. Therefore, it is desired to automate the modification process of visual content. In many cases, it is desired to apply the same visual modification to a large number of visual contents. However, defining the desired modification (for example as computer software configured to perform the modification) may be challenging or even impossible when dealing with complex modifications. Therefore, it is desirable to demonstrate the modification with an example.

Figure 10:
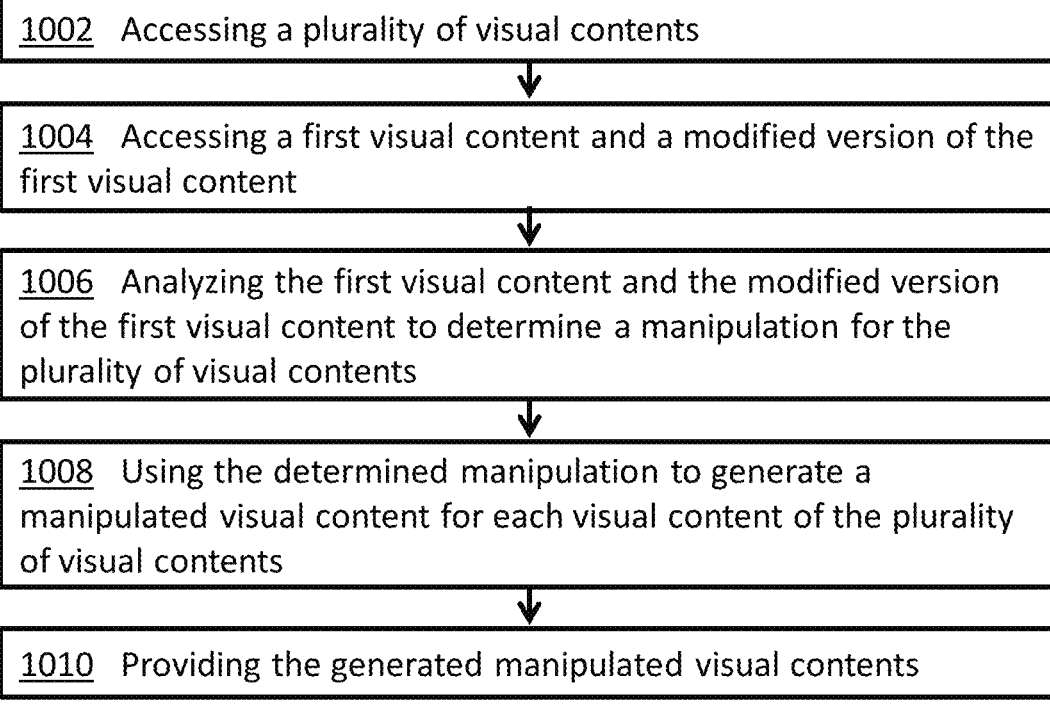
FIG. 10 is a flowchart of an exemplary method for propagating changes from one visual content to other visual contents.

FIG. 10 is a flowchart of an exemplary method 1000 for propagating changes from one visual content to other visual contents. In this example, method 1000 may comprise: accessing a plurality of visual contents (Step 1002); accessing a first visual content and a modified version of the first visual content (Step 1004); analyzing the first visual content and the modified version of the first visual content to determine a manipulation for the plurality of visual contents (Step 1006); using the determined manipulation to generate a manipulated visual content for each visual content of the plurality of visual contents (Step 1008); and providing the generated manipulated visual contents (Step 1010).

In some examples, Step 1002 may comprise accessing a plurality of visual contents. In one example, accessing the plurality of visual contents may comprise at least one of reading at least part of the plurality of visual contents from memory, receiving at least part of the plurality of visual contents from an external device, capturing at least part of the plurality of visual contents using one or more image sensors, generating at least part of the plurality of visual contents (for example by analyzing another visual content, for example using method 400, using method 600, using method 900, using method 1000, etc.), and so forth. In one example, Step 1002 may use Step 1202 to access the plurality of visual contents. Some non-limiting examples of such visual contents may include images, 2-dimensional images, 3-dimensional images, video clips, 2-dimensional video clips, 3-dimensional video clips, animations, 3-dimensional animations, 2-dimensional animations, illustrations, 2-dimensional illustrations, 3-dimensional illustrations, and so forth. In one example, the plurality of visual contents may include visual contents of different types. In another example, all visual contents of the plurality of visual contents may be of the same type.

In some examples, Step 1004 may comprise accessing a first visual content and/or a modified version of the first visual content. In one example, accessing the first visual content and/or the modified version of the first visual content may comprise at least one of reading the first visual content and/or the modified version of the first visual content from memory, receiving the first visual content and/or the modified version of the first visual content from an external device, capturing the first visual content and/or the modified version of the first visual content using an image sensor, generating the first visual content and/or the modified version of the first visual content (for example by analyzing another visual content, for example using method 400, using method 600, using method 900, using method 1000, etc.), and so forth. Some non-limiting examples of such visual content and/or modified version of the visual content may include an image, a 2-dimensional image, a 3-dimensional image, a video clip, a 2-dimensional video clip, a 3-dimensional video clip, an animation, a 3-dimensional animation, a 2-dimensional animation, an illustration, a 2-dimensional illustration, a 3-dimensional illustration, and so forth. In one example, the first visual content and the modified version of the first visual content may include visual contents of different types. In another example, the first visual content and the modified version of the first visual content may be of the same type. In one example, the modified version of the first visual content may be a modified version of the first visual content prepared by a user. In another example, the modified version of the first visual content may be a modified version of the first visual content generated automatically. In one example, the first visual content may include at least an image captured using an image sensor, and the modified version of the first visual content may include the image after at least one manual modification.

In some examples, Step 1006 may comprise analyzing the first visual content accessed by Step 1004 and the modified version of the first visual content accessed by Step 1004 to determine a manipulation for the plurality of visual contents accessed by Step 1002. In some examples, Step 1006 may compare the first visual content accessed by Step 1004 and the modified version of the first visual content accessed by Step 1004 to determine the manipulation for the plurality of visual contents accessed by Step 1002. For example, Step 1006 may compare the first visual content and the modified version of the first visual content to identify at least one modification from the first visual content to the modified version of the first visual content, and may base the manipulation for the plurality of visual contents on the identified at least one modification. For example, the at least one modification may include an insertion of a particular object to the visual content, and the determined manipulation may include an insertion of the particular object. In another example, the at least one modification may include a removal of a particular object from the visual content, and the determined manipulation may include a removal of the particular object from visual contents that include the particular object. In yet another example, at least one modification may include a change in position and/or orientation of a particular object in the visual content, and the determined manipulation may include changing the position and/or orientation of the particular object in visual contents that include the particular object. In an additional example, the at least one modification may include a replacement of a first object with a second object in the visual content, and the determined manipulation may include a replacement of the first object with the second object in visual contents that include the first object.

In some examples, Step 1008 may comprise using the manipulation determined by Step 1006 to generate a manipulated visual content for each visual content of the plurality of visual contents accessed by Step 1002. For example, the manipulation determined by Step 1006 may include a transformation function configured to transform visual contents, and Step 1008 may use the transformation function to transform each visual content of the plurality of visual contents accessed by Step 1002 and thereby generate the manipulated visual content for the visual content. In another example, the manipulation determined by Step 1006 may include an insertion of a particular object, and Step 1008 may insert the particular object to each visual content of the plurality of visual contents accessed by Step 1002 and thereby generate the manipulated visual content for the visual content. In yet another example, the manipulation determined by Step 1006 may include a removal of a particular object from visual contents that include the particular object, and Step 1008 may remove the particular object from each visual content of the plurality of visual contents accessed by Step 1002 that includes the particular object to thereby generate the manipulated visual content for the visual content. In an additional example, the manipulation determined by Step 1006 may include changing a position and/or an orientation of a particular object in visual contents that include the particular object, and Step 1008 may change a position and/or an orientation of the particular object in each visual content of the plurality of visual contents accessed by Step 1002 that includes the particular object to thereby generate the manipulated visual content for the visual content. In yet another example, the manipulation determined by Step 1006 may include a replacement of the first object with the second object in visual contents that include the first object, and Step 1008 may replace the first object with the second object in each visual content of the plurality of visual contents accessed by Step 1002 that includes the first object to thereby generate the manipulated visual content for the visual content.

In some examples, each visual content of the plurality of visual contents accessed by Step 1002 may include at least a visual element corresponding to a particular brand and a visual element unrelated to the particular brand, and for each visual content of the plurality of visual contents accessed by Step 1002, the manipulated visual content corresponding to the visual content and generated by Step 1008 may include at least the visual element corresponding to the particular brand from the corresponding visual content and a manipulated version of the visual element unrelated to the particular brand. In one example, the first visual content does not include any visual element corresponding to the particular brand. In one example, the visual elements corresponding to the particular brands may include at least one of a logo corresponding to the particular brand, a product corresponding to the particular brand, and a visual element in a color scheme corresponding to the particular brand.

In some examples, each visual content of the plurality of visual contents accessed by Step 1002 may include at least a visual element corresponding to a particular brand, and generating the manipulated visual content for the visual content in Step 1008 may include modifying the visual element corresponding to the particular brand.

In some examples, Step 1010 may comprise providing the generated manipulated visual contents generated by Step 1008. For example, providing the generated manipulated visual contents generated by Step 1008 may include at least one of storing the generated manipulated visual contents in memory, transmitting the generated manipulated visual contents to an external device, and so forth. In one non-limiting example, providing the generated manipulated visual contents may include providing each one of the generated manipulated visual contents to a different entity (for example, to a different user, to a different process, to a different user interface, to a different territory, and so forth). In one non-limiting example, providing the generated manipulated visual contents may include causing a printing of each one of the generated manipulated visual contents. In one non-limiting example, providing the generated manipulated visual contents may include causing a display on at least one computer screen of each one of the generated manipulated visual contents.

In some examples, Step 1006 may comprise calculating a convolution of at least part of the first visual content accessed by Step 1004, calculating a convolution of at least part of the modified version of the first visual content accessed by Step 1004, and using the calculated convolution of the at least part of the first visual content and the calculated convolution of the at least part of the modified version of the first visual content to determine the manipulation for the plurality of visual contents accessed by Step 1002. For example, Step 1006 may compare the calculated convolution of the at least part of the first visual content and the calculated convolution of the at least part of the modified version of the first visual content to determine the manipulation for the plurality of visual contents. In another example, Step 1006 may calculate a ratio of the calculated convolution of the at least part of the first visual content and the calculated convolution of the at least part of the modified version of the first visual content, and may use the calculated ratio to determine the manipulation for the plurality of visual contents. For example, Step 1006 may use the calculated ratio as a parameter to a parametric family of manipulation functions to determine a non-parametric manipulation function, and therefore determine the manipulation for the plurality of visual contents. In some examples, using the determined manipulation to generate a manipulated visual content for a visual content by Step 1008 may include: calculating convolution of at least part of the visual content, and using the calculated convolution of the at least part of the visual content (for example, together with the calculated convolution of the at least part of the first visual content and the calculated convolution of the at least part of the modified version of the first visual content) to generate the manipulated visual content. For example, the manipulated visual content may be a result of applying a parametric transformation function on the visual content with the calculated convolution of the at least part of the visual content as a parameter.

In some examples, Step 1006 may analyze the first visual content accessed by Step 1004 and the modified version of the first visual content accessed by Step 1004 to determine a mathematical relation in a mathematical space between a mathematical object in the mathematical space corresponding to the first visual content and a mathematical object in the mathematical space corresponding to the modified version of the first visual content. In one example, Step 1006 may determine the mathematical objects in the mathematical space corresponding to the first visual content and the modified version of the first visual content (for example as described in relation to Step 904 and/or Step 822). In one example, Step 1006 may determine the mathematical relation by calculating a function of the mathematical object in the mathematical space corresponding to the first visual content and the mathematical object in the mathematical space corresponding to the modified version of the first visual content. In another example, Step 1006 may determine the mathematical relation based on a at least one of a distance, a similarity measure, a mathematical correlation and an affinity measure between the mathematical object in the mathematical space corresponding to the first visual content and the mathematical object in the mathematical space corresponding to the modified version of the first visual content. Further, in some examples, Step 1008 may using the determined mathematical relation to determine mathematical objects in the mathematical space corresponding to the manipulated visual contents. For example, for each particular visual content of the plurality of visual contents accessed by Step 1002, Step 1008 may determine a first mathematical object in the mathematical space corresponding to the particular visual content (for example as described in relation to Step 904 and/or Step 822), may determine a second mathematical object in the mathematical space that has the determined mathematical relation with the first mathematical object in the mathematical space, and Step 1008 may use the second mathematical object as the mathematical object in the mathematical space corresponding to the manipulated visual content corresponding to the particular visual content. Further, Step 1008 may use the determined mathematical objects in the mathematical space corresponding to the manipulated visual contents to generate the manipulated visual contents. For example, for each particular mathematical object in the determined mathematical objects corresponding to the manipulated visual contents, Step 1008 may generate a visual content corresponding to the particular mathematical object (for example as described in relation to Step 912 and/or Step 826), and the generated visual content may be one of the manipulated visual contents. In one example, the mathematical space may be a non-orientable space. Some non-limiting examples of such non-orientable space may include Mobius strips, Roman surfaces, real projective planes, and Klein bottles.

In some examples, the first visual content accessed by Step 1004 may include a person of a first ethnicity, the modified version of the first visual content accessed by Step 1004 may include a replacement of the person to a corresponding person of a second ethnicity, and the manipulation determined by Step 1006 may include at least replacing people of the first ethnicity to corresponding people of the second ethnicity. For example, Step 1006 may use a visual classifier to determine that the first visual content includes the person of the first ethnicity and/or that the modified version of the first visual content includes the person of the second ethnicity, and may determine that the person of the second ethnicity corresponds and/or replace the person of the first ethnicity based on at least one of (or a combination of at least two of, a combination of at least three of, etc.) the person of the second ethnicity not being depicted in the first visual content, the person of the first ethnicity not being depicted in the modified version of the first visual content, the two persons having the same or a similar position, the two persons being of a similar age, the two persons being of the same gender, the two persons wearing the same or similar clothes, the two persons being engaged in the same activity, and so forth. Further, in some examples, for each particular visual content in the plurality of visual contents accessed by Step 1002, Step 1008 may replace persons of the first ethnicity in the particular visual content with persons of the second ethnicity to generate the manipulated visual content for the particular content.

In some examples, the first visual content accessed by Step 1004 may include a person of a first gender, the modified version of the first visual content accessed by Step 1004 may include a replacement of the person to a corresponding person of a second gender, and the manipulation determined by Step 1006 may include at least replacing people of the first gender to corresponding people of the second gender. For example, Step 1006 may use a visual classifier to determine that the first visual content includes the person of the first gender and/or that the modified version of the first visual content includes the person of the second gender, and may determine that the person of the second gender corresponds and/or replace the person of the first gender based on at least one of (or a combination of at least two of, a combination of at least three of, etc.) the person of the second gender not being depicted in the first visual content, the person of the first gender not being depicted in the modified version of the first visual content, the two persons having the same or a similar position, the two persons being of a similar age, the two persons being of the same or similar ethnicity, the two persons wearing the same or similar clothes, the two persons being engaged in the same activity, and so forth. Further, in some examples, for each particular visual content in the plurality of visual contents accessed by Step 1002, Step 1008 may replace persons of the first gender in the particular visual content with persons of the second gender to generate the manipulated visual content for the particular content.

In some examples, the first visual content accessed by Step 1004 may include a person of a first age group, the modified version of the first visual content accessed by Step 1004 may include a replacement of the person to a corresponding person of a second age group, and the manipulation determined by Step 1006 may include at least replacing people of the first age group to corresponding people of the second age group. For example, Step 1006 may use a visual classifier to determine that the first visual content includes the person of the first age group and/or that the modified version of the first visual content includes the person of the second age group, and may determine that the person of the second age group corresponds and/or replace the person of the first age group based on at least one of (or a combination of at least two of, a combination of at least three of, etc.) the person of the second age group not being depicted in the first visual content, the person of the first age group not being depicted in the modified version of the first visual content, the two persons having the same or a similar position, the two persons being of the same gender, the two persons being of the same or similar ethnicity, the two persons wearing the same or similar clothes, the two persons being engaged in the same activity, and so forth. Further, in some examples, for each particular visual content in the plurality of visual contents accessed by Step 1002, Step 1008 may replace persons of the first age group in the particular visual content with persons of the second age group to generate the manipulated visual content for the particular content.

In some examples, the first visual content accessed by Step 1004 may include a person at a first pose, the modified version of the first visual content accessed by Step 1004 may include a modification of the pose of the person to a second pose, and the manipulation determined by Step 1006 may include at least modifying pose of people from the first pose to the second pose. For example, Step 1006 may use a visual classifier and/or a visual pose estimation algorithm to determine that the first visual content includes the person of the first pose and/or that the modified version of the first visual content includes the person of the second pose, and may determine that the person of the second pose corresponds and/or replace the person of the first pose based on at least one of (or a combination of at least two of, a combination of at least three of, etc.) the person of the second pose not being depicted in the first visual content, the person of the first pose not being depicted in the modified version of the first visual content, the two persons having the same or a similar position, the two persons being of a similar age, the two persons being of the same gender, the two persons wearing the same or similar clothes, the two persons being engaged in the same activity, and so forth. Further, in some examples, for each particular visual content in the plurality of visual contents accessed by Step 1002, Step 1008 may replace persons of the first pose in the particular visual content with persons of the second pose to generate the manipulated visual content for the particular content.

In some examples, wherein the first visual content accessed by Step 1004 may include a first product of a first family of products, the modified version of the first visual content accessed by Step 1004 may include a replacement of the first product to a corresponding product of a second family of products, and the manipulation determined by Step 1006 may include at least replacing products of the first family of products with products of the second family of products. For example, Step 1006 may use a visual classifier or a product recognition algorithm to determine that the first visual content includes the first product of the first family of products and/or that the modified version of the first visual content includes the product of the second family of products, and may determine that the first product of the first family of products corresponds and/or replace the product of the second family of products based on at least one of (or a combination of at least two of, a combination of at least three of, etc.) the product of the second family of products not being depicted in the first visual content, the first product not being depicted in the modified version of the first visual content, the two products having the same or a similar position, the two products being used by the same person, and so forth. Further, in some examples, for each particular visual content in the plurality of visual contents accessed by Step 1002, Step 1008 may replace products of the first family of products in the particular visual content with products of the second family of products to generate the manipulated visual content for the particular content.

In some examples, the first visual content accessed by Step 1004 may include a product with a first logo appearing on the product, the modified version of the first visual content accessed by Step 1004 may include a replacement of the first logo to a second logo, and the manipulation determined by Step 1006 may include at least replacing the first logo to the second logo when the first logo appears on products. For example, Step 1006 may use a visual classifier and/or a product detection algorithm and/or a logo recognition algorithm to determine that the first visual content includes the first product with the first logo and/or that the modified version of the first visual content includes the product with the second logo, and may determine that the first logo corresponds and/or replace the second logo based on at least one of (or a combination of at least two of, a combination of at least three of, etc.) the second logo not being depicted in the first visual content, the first logo not being depicted in the modified version of the first visual content, the two logos having the same or a similar position, the two logos being on the same product, and so forth. Further, in some examples, for each particular visual content in the plurality of visual contents accessed by Step 1002, Step 1008 may replace the first logo on products in the particular visual content with the second logo to generate the manipulated visual content for the particular content.

In some examples, the first visual content accessed by Step 1004 may include a first landscape of a first type of landscapes, the modified version of the first visual content accessed by Step 1004 may include a replacement of the first landscape with a landscape of a second type of landscapes, and the manipulation determined by Step 1006 may include at least replacing landscapes of the first type with landscapes of the second type. For example, Step 1006 may use a visual classifier to determine that the first visual content includes the first landscape of the first type of landscapes and/or that the modified version of the first visual content includes the landscape of the second type of landscapes. Further, in some examples, for each particular visual content in the plurality of visual contents accessed by Step 1002, Step 1008 may replace landscapes of the first type of landscapes in the particular visual content with landscapes of the second type of landscapes to generate the manipulated visual content for the particular content.

In some examples, the first visual content accessed by Step 1004 may correspond to a first part of day, the modified version of the first visual content accessed by Step 1004 may correspond to a second part of day, and the manipulation determined by Step 1006 may include changing visual characteristics corresponding to the first part of day to visual characteristics corresponding to the second part of day. For example, Step 1006 may use a visual classifier to determine that the first visual content corresponds to the first part of day and/or that the modified version of the first visual content corresponds to the second part of day. Further, in some examples, for each particular visual content in the plurality of visual contents accessed by Step 1002, Step 1008 may change visual characteristics corresponding to the first part of day in the particular visual content to visual characteristics corresponding to the second part of day to generate the manipulated visual content for the particular content.

In some examples, the first visual content accessed by Step 1004 may correspond to a first season, the modified version of the first visual content accessed by Step 1004 may correspond to a second season, and the manipulation determined by Step 1006 may include changing visual characteristics corresponding to the first season to visual characteristics corresponding to the second season. For example, Step 1006 may use a visual classifier to determine that the first visual content corresponds to the first season and/or that the modified version of the first visual content corresponds to the second season. Further, in some examples, for each particular visual content in the plurality of visual contents accessed by Step 1002, Step 1008 may change visual characteristics corresponding to the first season in the particular visual content to visual characteristics corresponding to the second season to generate the manipulated visual content for the particular content.

In some examples, the plurality of visual contents accessed by Step 1002 may include the visual content of FIG. 3E. Further, the first visual content accessed by Step 1004 may be the visual content of FIG. 3C and the modified version of the first visual content accessed by Step 1004 may be the visual content of FIG. 3D. Further, Step 1006 may analyze the visual content of FIG. 3C and the visual content of FIG. 3D to determine the manipulation for the plurality of visual contents. For example, the determined manipulation may be adding a particular logo, preferably on a tie. Further, Step 1008 may determine that the visual content of FIG. 3E does not include a tie, but does include a plurality of other objects (for example using an object detection and/or recognition algorithm). Further, Step 1008 may determine that of the plurality of other object, a jacket may have the highest affinity to a tie (for example, using a column corresponding to a tie in an affinity matrix that includes affinities for different pairs of objects as elements, using an affinity function, and so forth). Further, Step 1008 may add the particular logo on the jacket of the visual content of FIG. 3E to generate the visual content of FIG. 3F. Further, Step 1010 may provide a plurality of manipulated visual contents that includes the visual content of FIG. 3F.

Figure 11:
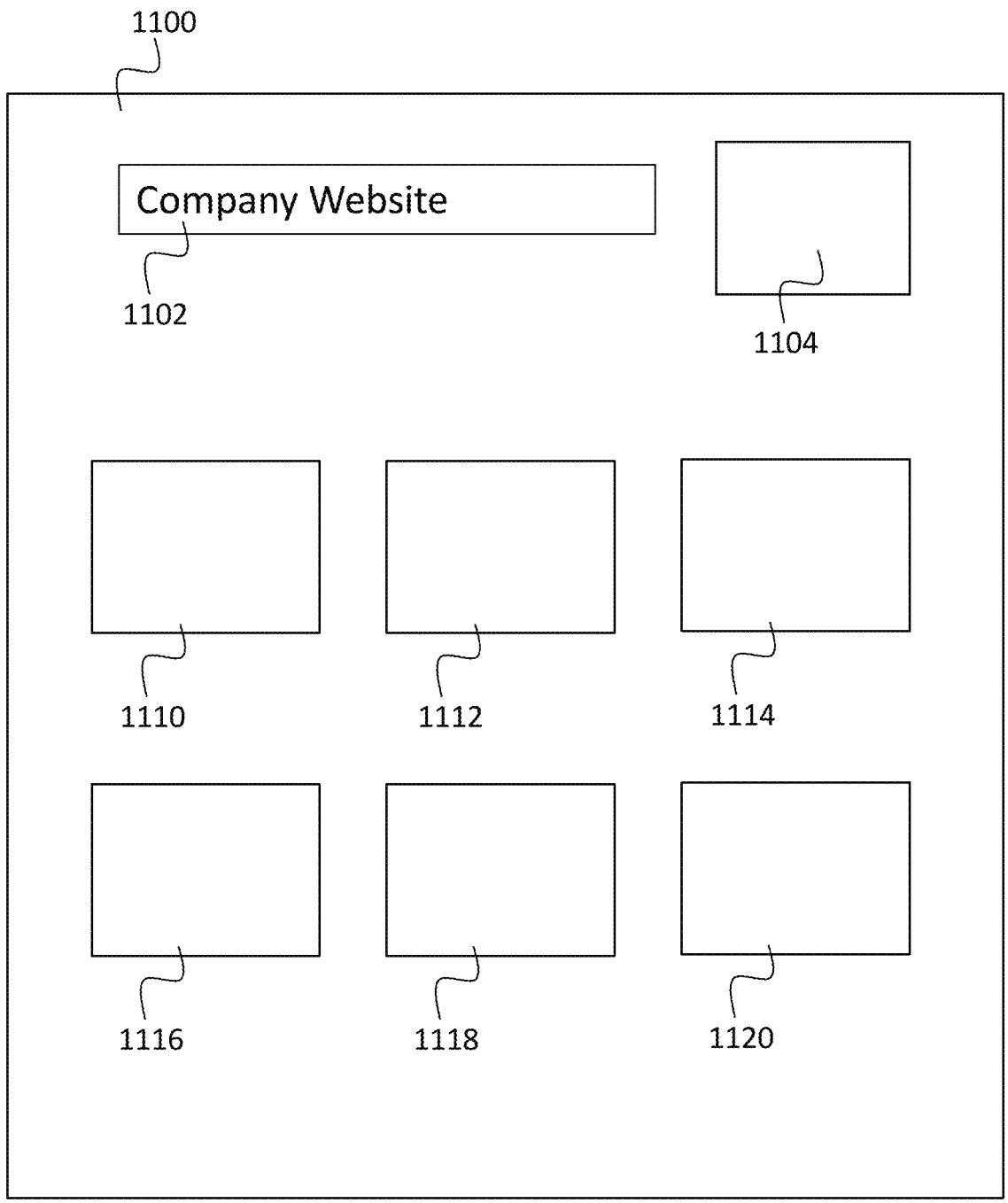
FIG. 11 is an illustration of exemplary user interface.

FIG. 11 is an illustration of exemplary user interface 1100. In this example, user interface 1100 may include title 1102, logo 1104, and visual contents 1110, 1112, 1114, 1116, 1118 and 1120. User interface 1100 is an example, and other user interfaces may be used, including all, some or none of the elements of user interface 1100, and in some examples including additional elements not included in user interface 1100.

Figure 12:
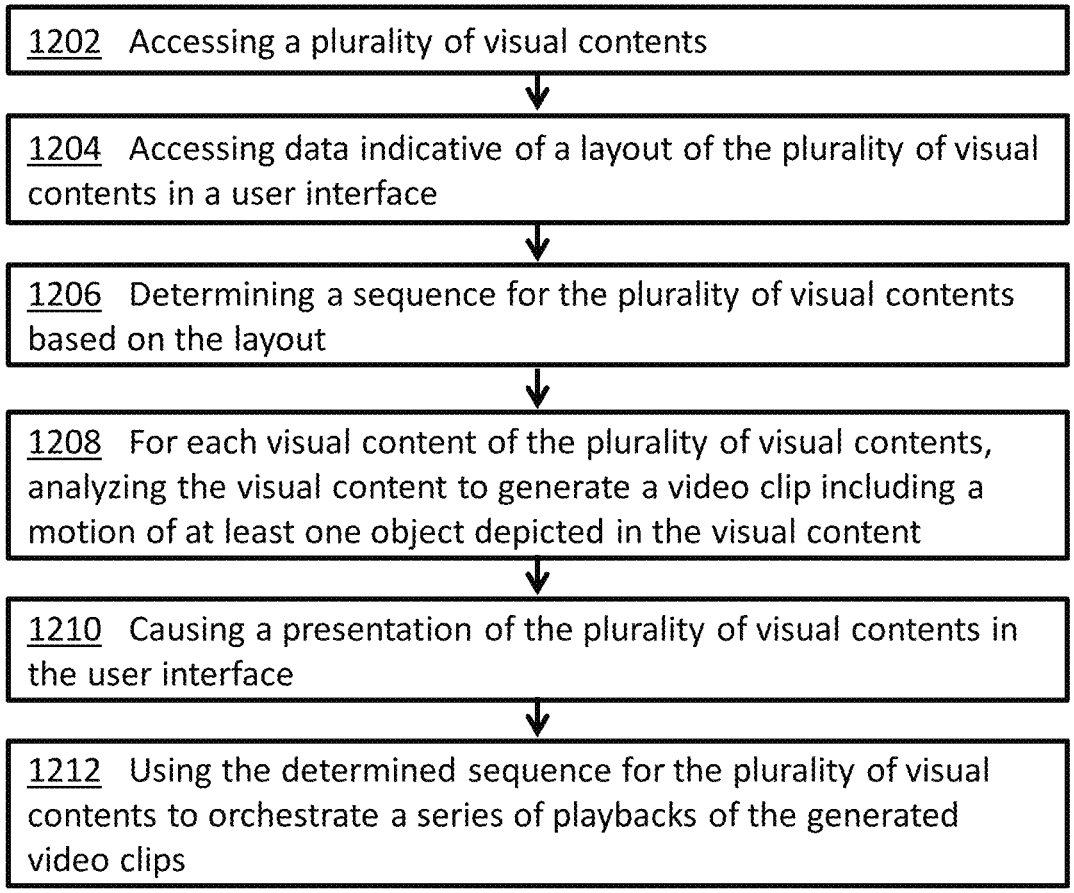
FIG. 12 is a flowchart of an exemplary method for generating and orchestrating motion of visual contents.

FIG. 12 is a flowchart of an exemplary method 1200 for generating and orchestrating motion of visual contents. In this example, method 1200 may comprise: accessing a plurality of visual contents (Step 1202); accessing data indicative of a layout of the plurality of visual contents in a user interface (Step 1204); determining a sequence for the plurality of visual contents based on the layout (Step 1206); for each visual content of the plurality of visual contents, analyzing the visual content to generate a video clip including a motion of at least one object depicted in the visual content (Step 1208); causing a presentation of the plurality of visual contents in the user interface (Step 1210); and using the determined sequence for the plurality of visual contents to orchestrate a series of playbacks of the generated video clips (Step 1212).

In some examples, Step 1202 may comprise accessing a plurality of visual contents, for example as described above in relation to Step 1002. In one example, Step 1202 may use Step 1002 to access the plurality of visual contents. In one example, Step 1202 may access visual contents in a user interface, for example in the user interface of Step 1204, for example by analyzing the user interface. Some non-limiting examples of such visual contents may include images, 2-dimensional images, 3-dimensional images, video clips, 2-dimensional video clips, 3-dimensional video clips, animations, 3-dimensional animations, 2-dimensional animations, illustrations, 2-dimensional illustrations, 3-dimensional illustrations, and so forth. In one example, the plurality of visual contents may include visual contents of different types. In another example, all visual contents of the plurality of visual contents may be of the same type.

In some examples, Step 1204 may comprise accessing data indicative of a layout of the plurality of visual contents accessed by Step 1202 in a user interface. Some non-limiting examples of such user interface may include a user interface of a computer software, a user interface of an app, a website, an interactive user interface, a non-interactive user interface, and so forth. In one example, accessing the data indicative of the layout of the plurality of visual contents in the user interface may include at least one of reading the data from memory, receiving the data from an external device, determining the data as described below, generating the layout and/or the data (for example, using a generative model), and so forth. In one example, Step 1204 may analyze an image of the user interface (such as a screen shot of the user interface, a printout of the user interface, a rendering of the user interface, etc.) to determine the layout of the plurality of visual contents in the user interface, for example by identifying the locations and/or sizes of the visual contents in the user interface. In one example, Step 1204 may analyze one or more Cascading Style Sheets (CSS) files associated with the user interface to determine the layout of the plurality of visual contents in a user interface.

In some examples, Step 1206 may comprise determining a sequence for the plurality of visual contents accessed by Step 1202 based on the layout of Step 1204. In one example, the sequence for the plurality of visual contents determined by Step 1206 may be configured to guide a user attention through the user interface. In some examples, for each pair of visual contents of the plurality of visual contents, Step 1206 may calculate an affinity between the two visual contents, for example based on the layout of Step 1204, or using any other affinity function (for example, based on any similarity measure, based on any distance function, and so forth). For example, the affinity of two visual contents may be based on a distance between the two visual contents in the layout of Step 1204. In another example, the affinity of two visual contents may be based on at least two of a distance between the two visual contents in the layout of Step 1204, a visual similarity measure between the two visual contents, dimensions associated with the two visual contents, and a prospective viewer. Further, Step 1206 may construct a mathematical graph where each node of the mathematical graph corresponds to a different visual content of the plurality of visual contents, and each edge of the mathematical graph is associated with a weight based on the calculated affinity between the two visual contents corresponding to the edge. Further, Step 1206 may analyze the graph to determine the sequence for the plurality of visual contents accessed by Step 1202. For example, Step 1206 may determine a path (such as the shortest possible path) that connects all the nodes of the graph, and the sequence for the plurality of visual contents may correspond to the determined path.

In some examples, Step 1206 may analyze each visual content of the plurality of visual contents accessed by Step 1202 to determine a mathematical object corresponding to the visual content in a mathematical space (for example as described in relation to Step 904 and/or Step 822), and may further base the determination of the sequence for the plurality of visual contents on the mathematical objects corresponding to the plurality of visual contents. In one example, the mathematical space may be a non-orientable space. Some non-limiting examples of such non-orientable spaces may include Mobius strips, Roman surfaces, real projective planes, and Klein bottles. In one example, Step 1206 may start the sequence with a particular visual content of the plurality of visual contents (for example, a particular visual content selected randomly of the plurality of visual contents, a particular visual content selected based on a rule, a particular visual content selected by a user, a particular visual content selected based on the mathematical object corresponding to it, and so forth). Further, Step 1206 may repeatedly: select a mathematical object of the mathematical objects corresponding to visual content not yet in the sequence that is nearest in the mathematical space to the mathematical object corresponding to last visual content added to the sequence, and add the visual content corresponding to the selected mathematical object (for example at the end of the current sequence); until all visual contents of the plurality of visual contents are in the sequence. In some examples, the mathematical object corresponding to the visual content in a mathematical space may be based on at least two of an analysis of the visual content, a convolution of at least part of the visual content, a position of the visual content in the layout of Step 1204, dimensions associated with the visual content, and a prospective viewer. For example, a mathematical vector may be constructed by aggregating numerical values associated with the at least two of data resulting from an analysis of the visual content, a convolution of at least part of the visual content, a position of the visual content in the layout of Step 1204, dimensions associated with the visual content, and a compatibility score of a prospective viewer to the visual content.

In some examples, the determination of the sequence for the plurality of visual contents by Step 1206 may be further based on an analysis of the plurality of visual contents. In one example, Step 1206 may analyze the visual contents to detect objects in the visual contents (for example, using object detection and/or object recognition algorithms), and may determine the sequence based on the objects in the visual contents and/or the layout of Step 1204. For example, Step 1206 may position visual contents sharing a large number of identical or similar objects close by to one another in the sequence. In one example, the weight associated with an edge of the mathematical graph described above may be further based on a visual similarity measure between the two visual contents corresponding to the edge.

In some examples, the determination of the sequence for the plurality of visual contents by Step 1206 may be further based on a prospective viewer. For example, in response to a first prospective viewer, Step 1206 may determine a first sequence for the plurality of visual contents accessed by Step 1202, and in response to a second prospective viewer, Step 1206 may determine a second sequence for the plurality of visual contents accessed by Step 1202, the second sequence may differ from the first sequence. For example, each visual content of the plurality of visual contents may correspond to a product, for a price-sensitive prospective viewer, the sequence determined by Step 1206 may correspond to a sequence of increasing product prices, while for a quality-sensitive prospective viewer, the sequence determined by Step 1206 may correspond to a sequence of decreasing product ratings. In another example, for a prospective view with a short attention span, Step 1206 may determine a sequence corresponding to fewer distractions and/or deviation from a main theme than a sequence determined for a prospective view with a longer attention span.

In some examples, determination of the sequence for the plurality of visual contents by Step 1206 may be further based on dimensions associated with the visual contents. Some non-limited examples of such dimensions associated with a visual content may include original dimension (such as height, width, number of pixels, etc.) of the visual content, viewing dimensions (such as height, width, number of pixels, etc.) corresponding to the visual content based on the layout of Step 1204, and so forth. In one example, the sequence determined by Step 1206 may correspond to a sequence of increasing and/or decreasing dimensions associated with the visual contents. In one example, the weight associated with an edge of the mathematical graph described above may be further based on a similarity measure between the dimensions of the two visual contents corresponding to the edge.

In some examples, for each visual content of the plurality of visual contents accessed by Step 1202, Step 1208 may comprise analyzing the visual content to generate a video clip including a motion of at least one object depicted in the visual content. For example, Step 1208 may use method 800 with the visual content used as the still image or with a still image extracted from the visual content (for example, a frame extracted from a video clip, a 2 dimensional slice extracted from a 3 dimensional visual content, etc.) to generate the video clip including the motion of at least one object depicted in the visual content. In some examples, Step 1208 may analyze the visual content to detect the at least object in the visual content, for example using an object detection algorithm. For example, Step 1208 may detect object of a particular type, such as products, products of a particular product type, objects of a specific category, and so forth. In one example, Step 1208 may move the at least one object in the visual content (for example along a predetermined path, along a random path, etc.) to generate frames of the video clip, and thereby generate the video clip. In another example, Step 1208 may cause the at least one object to transform (for example, changing colors, changing orientation, changing size, etc.) to generate frames of the video clip, and thereby generate the video clip. In yet another example, Step 1208 may cause portions of the at least one object to move in relation to other portions of the at least one object to generate frames of the video clip, and thereby generate the video clip. In some examples, Step 1208 may use a generative model to generate the video clip.

In some examples, Step 1208 may use the layout of Step 1204 to determine a duration for each generated video clip. For example, the duration of the generated video clip may be based on a position of the visual content corresponding to the video clip in the layout, for example based on a distance of the position of the visual content from a center of the layout, based on a distance of the positon of the visual content from a boundary of the layout, and so forth. In another example, the duration of the generated video clip may be based on a density of elements in the area surrounding the visual content in the layout. In some examples, Step 1208 may use the layout of Step 1204 to determine a direction of motion corresponding to each generated video clip. For example, the direction of motion corresponding to a generated video clip may be based on a position of the visual content corresponding to the video clip in the layout. For example the direction of motion may be in the direction going from the position of the visual content corresponding to the video clip in the layout to the center of the layout, in the direction going from the position of the visual content corresponding to the video clip in the layout to another element in the layout, in the direction going to the position of the visual content corresponding to the video clip in the layout from another element in the layout, and so forth. In one example, the direction of motion corresponding to a generated video clip may be based on a position in the layout of a visual content immediately preceding the visual content corresponding to the video clip in the sequence determined by Step 1206, based on a position in the layout of a visual content immediately succeeding the visual content corresponding to the video clip in the sequence determined by Step 1206, and so forth. For example, the direction of motion may be from the position in the layout of a visual content immediately preceding the visual content corresponding to the video clip in the sequence determined by Step 1206 and/or towards the position in the layout of a visual content immediately succeeding the visual content corresponding to the video clip in the sequence determined by Step 1206.

In some examples, Step 1210 may comprise causing a presentation of the plurality of visual contents accessed by Step 1202 in the user interface of Step 1204. In some examples, a specification of the user interface (for example, in an html file, in an xml file, and so forth) may include links to the visual contents, and a software and/or a system configured to display the user interface may access the visual contents in response to the links. In one example, Step 1210 may cause the software and/or the system to display the user interface. In another example, Step 1210 may embed and/or modify the links included in the specification of the user interface to cause the software and/or the system to display the plurality of visual contents accessed by Step 1202 in the user interface of Step 1204. In some examples, a software and/or a system controlling a user interface may be configured to retrieve visual contents for display in the user interface from memory and/or from external devices. In one example, Step 1210 may comprise storing the plurality of visual contents accessed by Step 1202 in memory to enable and/or cause the software and/or the system to display the plurality of visual contents in the user interface of Step 1204. In another example, Step 1210 may comprise communicating with the software and/or the system to provide the software and/or the system the plurality of visual contents accessed by Step 1202 for display in the user interface of Step 1204.

In some examples, Step 1212 may comprise using the sequence for the plurality of visual contents determined by Step 1206 to orchestrate a series of playbacks of the video clips generated by Step 1208. In one example, Step 1212 may transmit one or more digital signals configure to cause the playbacks of the video clips at the sequence determined by Step 1206. In another example, Step 1212 may modify a specification of the user interface, for example by embedding and/or modifying links in the specification of the user interface to cause the playbacks of the video clips at the sequence determined by Step 1206. In yet another example, Step 1212 may store the video clips in memory to enable and/or cause the playbacks of the video clips at the sequence determined by Step 1206. In an additional example, Step 1212 may communicate with an external system (for example, transmitting the video clips or data associated with the video clips to the external system) to enable and/or cause the playbacks of the video clips at the sequence determined by Step 1206. In one example, the playback of each video clip orchestrated by Step 1212 may be placed in the user interface of Step 1204 based on a position of the visual content corresponding to the video clip in the user interface. In one example, the playback orchestrated by Step 1212 of a first video clip of the video clips generated by Step 1208 may be configured to start after a completion of the playback orchestrated by Step 1212 of a second video clip of the video clips generated by Step 1208. In one example, the playback orchestrated by Step 1212 of a first video clip of the video clips generated by Step 1208 may be configured to start while the playback orchestrated by Step 1212 of a second video clip of the video clips generated by Step 1208 occurs.

In some examples, each visual content of the plurality of visual contents accessed by Step 1202 may include at least a depiction of a product. In some examples, each video clip generated by Step 1208 may include a motion of the product depicted in the corresponding visual content. In some examples, the determination of the sequence for the plurality of visual contents by Step 1206 may be further based on prices corresponding to the products depicted in the visual contents. For example, the sequence for the plurality of visual contents may correspond to a sequence of increasing prices, may correspond to a sequence of decreasing prices, and so forth. In another example, in response to a first price of a particular product depicted in a first visual content, the first visual content may come before a second visual content in the sequence determined by Step 1206, and in response to a second price of the particular product, the first visual content may come after the second visual content in the sequence determined by Step 1206. In some examples, the determination of the sequence for the plurality of visual contents by Step 1206 may be further based on historic sales data corresponding to the products depicted in the visual contents. For example, the sequence for the plurality of visual contents may correspond to a sequence of increasing cumulative sales, may correspond to a sequence of decreasing cumulative sales, and so forth. In another example, Step 1206 may analyze the historic sales data to identify that two products corresponding to two visual contents tend to be sold together, and in response to the identification, the two visual contents corresponding to the two products may be adjacent to one another in the sequence determined by Step 1206. In some examples, Step 1208 may use information related to a product depicted in a visual content to determine a length for the generated video clip corresponding to the visual content. For example, Step 1208 may generate longer video clips for more expensive products. In another example, Step 1208 may generate longer video clips for frequently selling products.

In some examples, a first generated video clip generated by Step 1208 may include a person looking to a direction of a particular visual content based on the layout of Step 1204 while refereeing (for example, audibly, with a gesture, with an visible action other than the look, etc.) to the particular visual content. In one example, a playback orchestrated by Step 1212 of a video clip generated by Step 1208 and corresponding to the particular visual content may be configured to start in conjunction with the person looking in the direction of the particular visual content.

The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. Additionally, although aspects of the disclosed embodiments are described as being stored in memory, one skilled in the art will appreciate that these aspects can also be stored on other types of computer readable media, such as secondary storage devices, e.g., hard disks or CD ROM, or other forms of RAM or ROM, USB media, DVD, Blu-ray, Ultra HD Blu-ray, or other optical drive media.

Computer programs based on the written description and disclosed methods are within the skills of an experienced developer. The various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, Objective-C, HTML, HTML/AJAX combinations, XML, or HTML with included Java applets.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The examples are to be construed as non-exclusive. Furthermore, the steps of the disclosed methods may be modified in any manner, including by reordering steps and/or inserting or deleting steps. It is intended, therefore, that the specification and examples be considered as illustrative only.

What is claimed is:

1. A non-transitory computer readable medium storing a software program comprising data and computer implementable instructions for carrying out a method for generating looped video clips, the method comprising:
   receiving a still image;
   analyzing the still image to generate a series of images, the series of images includes at least a first image, a middle image and a last image, the first image is substantially visually similar to the last image, and the middle image is visually different from the first image and the last image;
   providing the series of images in a format that enables playing the series of images in a video clip that starts with the first image and finishes with the last image, wherein repeating the video clip from the first image immediately after completing the playing of the video clip with a presentation of the last image creates visually smooth transaction in which the transition from the last image to the first image is visually indistinguishable from the transactions between frames within the video clip;
   determining a mathematical object corresponding to the still image in a mathematical space, the mathematical space includes at least a plurality of mathematical objects, each mathematical object of the plurality of mathematical objects corresponds to an image, the mathematical object corresponding to the still image is included in the plurality of mathematical objects;
   using the mathematical space and the mathematical object corresponding to the still image to obtain two or more mathematical objects of the plurality of mathematical objects; and
   using the obtained two or more mathematical objects to generate the series of images.

2. The non-transitory computer readable medium of claim 1, wherein each image of the series of images corresponds to one of the two or more mathematical objects.

3. The non-transitory computer readable medium of claim 2, wherein the distance in the mathematical space between any two mathematical objects corresponding to adjunct images of the series of images is below a particular threshold, the distance in the mathematical space between the two mathematical objects corresponding to the first image and the last image is below the particular threshold, and the distance in the mathematical space between the two mathematical objects corresponding to the first image and the middle image is above the particular threshold.

4. The non-transitory computer readable medium of claim 1, wherein the mathematical space is a non-orientable space.

5. The non-transitory computer readable medium of claim 1, wherein the method further comprises analyzing the still image to generate the mathematical space.

6. The non-transitory computer readable medium of claim 1, wherein the method further comprises:
   using the mathematical object corresponding to the still image to obtain a mathematical curve in the mathematical space; and
   using the mathematical curve to obtain the two or more mathematical objects of the plurality of mathematical objects.

7. The non-transitory computer readable medium of claim 6, wherein the obtained two or more mathematical objects are points on the mathematical curve.

8. The non-transitory computer readable medium of claim 7, wherein an order of images in the series of images corresponds to an order of the points on the mathematical curve.

9. The non-transitory computer readable medium of claim 1, wherein the still image includes a depiction of a cloud, and the series of images includes different depictions of the cloud.

10. The non-transitory computer readable medium of claim 1, wherein the series of images includes depictions of a first cloud and a second cloud, and the depiction of the first cloud in the first image is substantially visually similar to the depiction of the second cloud in the last image.

11. The non-transitory computer readable medium of claim 10, wherein the second cloud is not visible in the first image, the first cloud is not visible in the last image, and both the first cloud and the second cloud are visible in the middle image.

12. The non-transitory computer readable medium of claim 1, wherein the still image includes a depiction of a bird, the series of images includes different depictions of the bird.

13. The non-transitory computer readable medium of claim 1, wherein the series of images includes depictions of a first bird and a second bird, and the depiction of the first bird in the first image is substantially visually similar to the depiction of the second bird in the last image.

14. The non-transitory computer readable medium of claim 13, wherein the second bird is not visible in the first image, the first bird is not visible in the last image, and both the first bird and the second bird are visible in the middle image.

15. The non-transitory computer readable medium of claim 1, wherein still image includes a depiction of a vehicle, the series of images includes different depictions of the vehicle.

16. The non-transitory computer readable medium of claim 1, wherein the series of images includes depictions of a first vehicle and a second vehicle, and the depiction of the first vehicle in the first image is substantially visually similar to the depiction of the second vehicle in the last image.

17. The non-transitory computer readable medium of claim 16, wherein the second vehicle is not visible in the first image, the first vehicle is not visible in the last image, and both the first vehicle and the second vehicle are visible in the middle image.

18. A system for generating looped video clips, the system includes at least one processor configured to perform the steps of:
   receiving a still image;
   analyzing the still image to generate a series of images, the series of images includes at least a first image, a middle image and a last image, the first image is substantially visually similar to the last image, and the middle image is visually different from the first image and the last image;
   providing the series of images in a format that enables playing the series of images in a video clip that starts with the first image and finishes with the last image, wherein repeating the video clip from the first image immediately after completing the playing of the video clip with a presentation of the last image creates visually smooth transaction in which the transition from the last image to the first image is visually indistinguishable from the transactions between frames within the video clip, determining a mathematical object corresponding to the still image in a mathematical space, the mathematical space includes at least a plurality of mathematical objects, each mathematical object of the plurality of mathematical objects corresponds to an image, the mathematical object corresponding to the still image is included in the plurality of mathematical objects;

using the mathematical space and the mathematical object corresponding to the still image to obtain two or more mathematical objects of the plurality of mathematical objects; and using the obtained two or more mathematical objects to generate the series of images.

19. A method for generating looped video clips, the method comprising:

receiving a still image;

analyzing the still image to generate a series of images, the series of images includes at least a first image, a middle image and a last image, the first image is substantially visually similar to the last image, and the middle image is visually different from the first image and the last image; and providing the series of images in a format that enables playing the series of images in a video clip that starts with the first image and finishes with the last image, wherein repeating the video clip from the first image immediately after completing the playing of the video clip with a presentation of the last image creates visually smooth transaction in which the transition from the last image to the first image is visually indistinguishable from the transactions between frames within the video clip, determining a mathematical object corresponding to the still image in a mathematical space, the mathematical space includes at least a plurality of mathematical objects, each mathematical object of the plurality of mathematical objects corresponds to an image, the mathematical object corresponding to the still image is included in the plurality of mathematical objects;

using the mathematical space and the mathematical object corresponding to the still image to obtain two or more mathematical objects of the plurality of mathematical objects; and using the obtained two or more mathematical objects to generate the series of images.

* * * * *